(12) United States Patent
Jung et al.

(10) Patent No.: US 11,329,557 B2
(45) Date of Patent: May 10, 2022

(54) SINGLE-INDUCTOR MULTIPLE-OUTPUT (SIMO) CONVERTER AND CONTROL METHOD OF SIMO CONVERTER

(71) Applicants: SAMSUNG ELECTRONICS CO., LTD., Suwon-si (KR); Korea Advanced Institute of Science and Technology, Daejeon (KR)

(72) Inventors: Seungchul Jung, Suwon-si (KR); Kye-Seok Yoon, Seoul (KR); Gyu-Hyeong Cho, Daejeon (KR); Sang Joon Kim, Hwaseong-si (KR); Sang Jin Lim, Osan-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 15 days.

(21) Appl. No.: 16/553,405

(22) Filed: Aug. 28, 2019

(65) Prior Publication Data
US 2020/0076298 A1 Mar. 5, 2020

Related U.S. Application Data

(60) Provisional application No. 62/724,196, filed on Aug. 29, 2018.

(30) Foreign Application Priority Data

Jan. 3, 2019 (KR) .......................... 10-2019-0000545

(51) Int. Cl.
*H02M 3/157* (2006.01)
*H02M 1/00* (2006.01)

(52) U.S. Cl.
CPC ............. *H02M 3/157* (2013.01); *H02M 1/00* (2013.01); *H02M 1/009* (2021.05)

(58) Field of Classification Search
CPC ....... H02M 3/157; H02M 1/00; H02M 1/0035; H02M 1/008; H02M 1/009; H02M 3/158; H02M 3/1584; Y02B 70/10
See application file for complete search history.

(56) References Cited

U.S. PATENT DOCUMENTS

| 9,007,039 | B2 | 4/2015 | Kim et al. |
| 9,106,133 | B2 | 8/2015 | Gilloim |

(Continued)

FOREIGN PATENT DOCUMENTS

| JP | 2009-22093 A | 1/2009 |
| KR | 10-2012-0019930 A | 3/2012 |
| KR | 10-2013-0067344 A | 6/2013 |

OTHER PUBLICATIONS

Dongsheng Ma, et al., "Single-Inductor Multiple-Output Switching Converters With Time-Multiplexing Control in Discontinuous Conduction Mode", *IEEE Journal of Solid-State Circuits*, Jan. 2003, vol. 38, No. 1, pp. 89-100.

(Continued)

*Primary Examiner* — Matthew V Nguyen
(74) *Attorney, Agent, or Firm* — NSIP Law

(57) ABSTRACT

A single-inductor multiple-output (SIMO) converter includes a converter configured to provide respective voltages of a plurality of channels with a single inductor and a control logic configured to control switches of the converter based on clocks corresponding to the plurality of channels, wherein the control logic is configured to compare an output voltage of a selected channel of the plurality of channels that corresponds to a control target to a reference voltage of the selected channel based on a clock of the selected channel and operate in one of a first mode that adaptively adjusts a (Continued)

number of times that a pulse triggering a power transfer to the channel is generated, and a second mode that blocks a generation of the pulse.

27 Claims, 34 Drawing Sheets

(56) References Cited

U.S. PATENT DOCUMENTS

| | | | |
|---|---|---|---|
| 9,203,310 B2 | 12/2015 | Huang et al. | |
| 2009/0085535 A1 | 4/2009 | Wei | |
| 2009/0153124 A1* | 6/2009 | Ishii | H02M 3/156 323/290 |
| 2011/0242858 A1* | 10/2011 | Strzalkowski | H02M 3/33523 363/21.13 |
| 2012/0153912 A1* | 6/2012 | Demski | H02M 3/07 323/282 |
| 2012/0286576 A1* | 11/2012 | Jing | H02M 3/156 307/43 |
| 2013/0015893 A1 | 1/2013 | Severson | |
| 2013/0147457 A1 | 6/2013 | Kim et al. | |
| 2015/0311791 A1 | 10/2015 | Tseng et al. | |
| 2017/0012529 A1 | 1/2017 | Yamada et al. | |
| 2018/0062515 A1 | 3/2018 | Jung | |
| 2018/0175734 A1* | 6/2018 | Gherghescu | H02M 3/1588 |
| 2018/0198361 A1* | 7/2018 | Seong | H02M 1/08 |
| 2019/0052173 A1* | 2/2019 | Shumkov | H02M 3/1582 |
| 2020/0304020 A1* | 9/2020 | Lu | H02M 3/155 |

OTHER PUBLICATIONS

Dongsheng Ma, et al., A Pseudo-CCM/DCM SIMO Switching Converter With Freewheel Switching, *IEEE Journal of Solid-State Circuits*, Jun. 2003, vol. 38, No. 6, pp. 1007-1014.

Hanh-Phuc Le, et al., "A Single-Inductor Switching DC-DC Converter With Five Outputs and Ordered Power-Distributive Control", *IEEE Journal of Solid-State Circuits*, Dec. 2007, vol. 42, No. 12, pp. 2706-2714.

Min-Yong Jung, et al., "An Error-Based Controlled Single-Inductor 10-Output DC-DC Buck Converter With High Efficiency Under Light Load Using Adaptive Pulse Modulation", *IEEE Journal of Solid-State Circuits*, Dec. 2015, vol. 50, No. 12, pp. 2825-2838.

European Search Report dated Jan. 29, 2020 in counterpart European Application No. 19193718.4 (8 pages in English).

\* cited by examiner

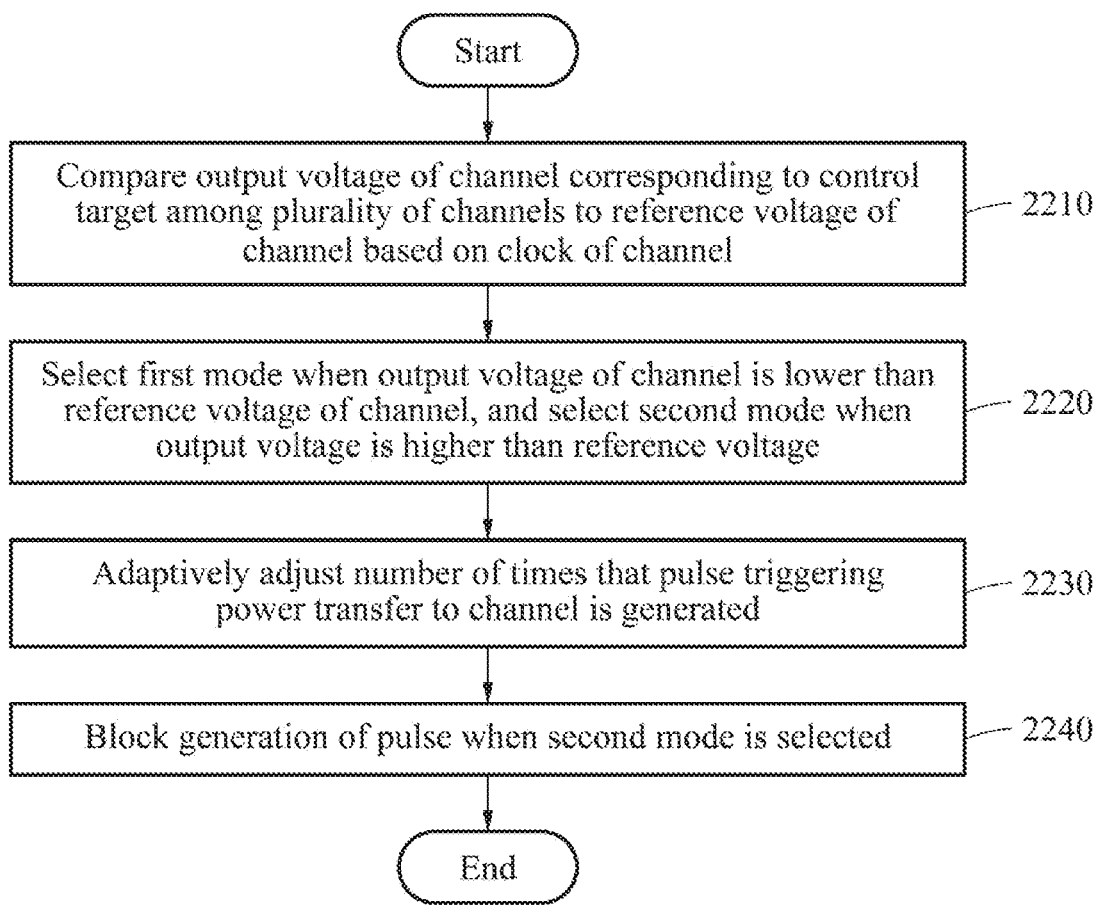

SINGLE-INDUCTOR MULTIPLE-OUTPUT (SIMO) CONVERTER AND CONTROL METHOD OF SIMO CONVERTER

CROSS-REFERENCE TO RELATED APPLICATIONS

This application claims the benefit under 35 U.S.C. § 119(e) of U.S. Provisional Application No. 62/724,196 filed on Aug. 29, 2018 in the U.S. Patent and Trademark Office and claims the benefit under 35 U.S.C. § 119(a) of Korean Patent Application No. 10-2019-0000545 filed on Jan. 3, 2019 in the Korean Intellectual Property Office, the entire disclosures of which are incorporated herein by reference for all purposes.

BACKGROUND

1. Field

This application relates to a single-inductor multiple-output (SIMO) converter and a control method of the SIMO converter.

2. Description of Related Art

A single-inductor multiple-output (SIMO) converter supplies energy needed by a plurality of output voltages using a single inductor. The SIMO converter recurrently selects the output voltages to supply the energy. In this instance, a method of controlling the SIMO converter such as a scheme for selecting the output voltages, an amount of energy to be supplied to correspond to the selected output voltage, and the like may be needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a single-inductor multiple-output (SIMO) converter includes a converter configured to provide respective voltages of a plurality of channels with a single inductor, and a control logic configured to control switches of the converter based on clocks corresponding to the plurality of channels, wherein the control logic is configured to compare an output voltage of a selected channel of the plurality of channels that corresponds to a control target to a reference voltage of the selected channel based on a clock of the selected channel and operate in one of a first mode that adaptively adjusts a number of times that a pulse triggering a power transfer to the channel is generated, and a second mode that blocks a generation of the pulse.

The control logic may be further configured to repetitively generate the pulse in the first mode until the output voltage of the selected channel is higher than the reference voltage of the selected channel based on a determination that the output voltage of the channel is lower than the reference voltage of the channel.

The control logic may be further configured to block the generation of the pulse in the second mode based on a determination that the output voltage of the selected channel is higher than the reference voltage of the selected channel.

The control logic may be further configured to dynamically control a frequency of the clock corresponding to the selected channel based on a number of times that an operation is performed in the first mode and a number of times that an operation is performed in the second mode.

The converter may be further configured to provide the respective voltages of the plurality of channels based on the clocks having different phases based on a time multiplexing scheme.

In the first mode, the control logic may be further configured to adaptively adjust the number of times that the pulse is generated in a time interval initiated in response to an edge of the clock corresponding to the selected channel.

The converter may include the single inductor, and a switching unit comprising first switches configured to select the plurality of channels and second switches configured to control a flow of a current flowing in the single inductor.

The first switches may be configured to connect output ports of the plurality of channels and the single inductor in series.

The second switches may include a $2\text{-}1^{st}$ switch, a $2\text{-}2^{nd}$ switch, and a $2\text{-}3^{rd}$ switch, the $2\text{-}1^{st}$ switch may be configured to have a first end connected to an input port of the converter and a second end connected to a first end of the single inductor, the $2\text{-}2^{nd}$ switch may be configured to have a first end connected to the first end of the single inductor, and a second end of the $2\text{-}2^{nd}$ switch is grounded, and the $2\text{-}3^{rd}$ switch may be configured to have a first end connected to a second end of the single inductor, and a second end of the $2\text{-}3^{rd}$ switch is grounded.

The control logic may include a switch controller configured to select a first switch for the selected channel from among the first switches in response to the pulse being generated, and control the second switches based on a sequence for generating a desired voltage of the channel.

The control logic may be configured to dynamically control a duty-ratio of the second switches based on an input voltage of the converter.

The control logic may be further configured to reset a current of the single inductor after the power transfer is triggered due to the generation of the pulse.

The control logic may be further configured to dynamically control a frequency of the clock corresponding to the channel based on a load in the channel.

The control logic may include a comparator configured to latch the output voltage of the channel at an edge of the clock corresponding to the channel, and compare the latched output voltage to the reference voltage of the channel.

The control logic may be further configured to generate the clocks corresponding to the plurality of channels based on an importance level of the plurality of channels and control lengths of time intervals corresponding to phases of the clocks.

In a general aspect, a control method includes comparing, based on a clock of a selected channel corresponding to a control target among a plurality of channels, an output voltage of the selected channel to a reference voltage of the selected channel, selecting a first mode when the output voltage is lower than the reference voltage, and selecting a second mode when the output voltage is higher than the reference voltage, adaptively adjusting, when the first mode is selected, a number of times that a pulse triggering a power transfer to the selected channel is generated, and blocking a generation of the pulse when the second mode is selected.

The adaptively adjusting the number of times that the pulse is generated may include repetitively generating the pulse until the output voltage of the selected channel is higher than the reference voltage of the selected channel based on the first mode.

The adaptively adjusting the number of times that the pulse is generated may include adaptively adjusting the number of times that the pulse is generated in a time interval initiated in response to an edge of the clock corresponding to the selected channel.

The method may further include counting a number of times that an operation is performed in the first mode and a number of times that an operation is performed in the second mode, and dynamically controlling a frequency of the clock corresponding to the selected channel based on a determination that the counted number of times corresponds to a preset number of times.

The dynamically controlling the frequency of the clock may include increasing the frequency of the clock corresponding to the selected channel when the number of times that an operation is performed in the first mode corresponds to the preset number of times.

The dynamically controlling the frequency of the clock may include reducing the frequency of the clock corresponding to the selected channel when the number of times that an operation is performed in the second mode corresponds to the preset number of times.

In a general aspect, a method includes comparing, in a single inductor multiple output (SIMO) converter, an output voltage of a selected channel among a plurality of channels to a reference voltage of the selected channel based on a clock of the selected channel, selecting a burst mode when the output voltage of the selected channel is less than or equal to the reference voltage, and selecting a pulse skip mode when the output voltage of the selected channel is greater than the reference voltage.

The method may further include adjusting a number of times a pulse triggering a power transfer to the selected channel is generated when the burst mode is selected, and blocking a generation of the pulse when the pulse skip mode is selected.

The SIMO converter may dynamically control a frequency of the clock corresponding to the selected channel by comparing a number of times that an operation is performed in the burst mode to a preset number of times, and comparing a number of times that an operation is performed in the pulse skip mode to the preset number of times.

Other features and aspects will be apparent from the following detailed description, the drawings, and the claims.

BRIEF DESCRIPTION OF THE DRAWINGS

FIG. 22 is flowchart illustrating an example of a control method of a SIMO converter.

Figure 1:
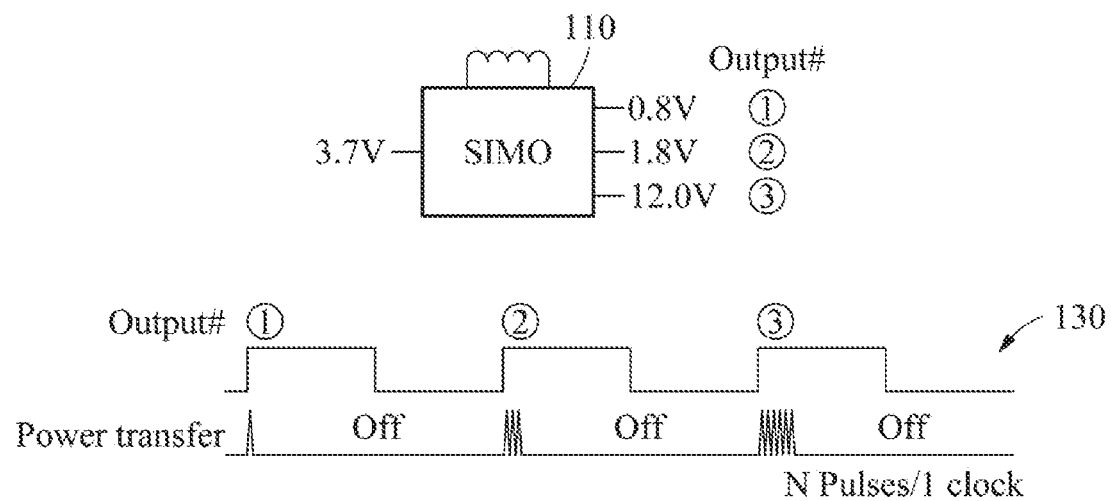
FIG. 1 illustrates an example of an operation of a single-inductor multiple output (SIMO) converter, in accordance with one or more embodiments.
Figure 1:
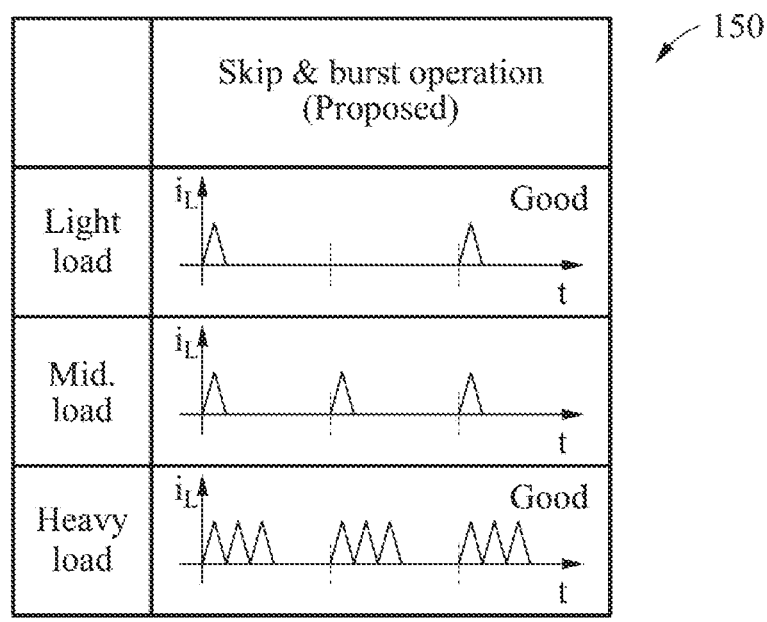

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Additionally, in the description of examples, like reference numerals refer to like elements throughout the disclosure of this application, and repeated description related thereto is omitted. Further, detailed description of well-known related structures or functions will be omitted when it is deemed that such description will cause ambiguous interpretation of the present disclosure.

FIG. 1 illustrates an example of an operation of a single-inductor multiple output (SIMO) converter. Referring to FIG. 1, a SIMO converter 110 provides desired voltages of a plurality of channels. The plurality of channels includes, for example, a first channel, a second channel, and a third channel. In an example, voltages of the first channel, the second channel, and the third channel are 0.8 volts (V), 1.8 V, and 12.0 V, respectively. In an example, the input voltage of the SIMO converter 110 is, for example, 3.7 V.

The SIMO converter 110 may operate based on a slow clock to reduce a standby power. Each of the channels of the SIMO converter 110 may operate based on a clock. An inductor current may operate in a discontinuous conduction mode (DCM) based on a clock such that the inductor current is reset for each clock. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The SIMO converter 110 may operate in a burst mode when an energy transfer to a channel is needed, and may operate in a pulse skip mode when an energy is sufficient. The SIMO converter 110 may compare an output voltage of a channel corresponding to a control target to a reference voltage, for example, a desired voltage of the channel based on a clock of the channel. The SIMO converter 110 operates in one of the burst mode and the pulse skip mode based on a voltage comparison result.

In this disclosure, the burst mode may be understood to be a mode in which a power is repetitively transferred through the inductor until the output voltage of the channel is higher than the reference voltage of the channel. The burst mode may also be referred to as a first mode. The pulse skip mode may be understood as a mode for blocking a generation of a pulse to the channel. The pulse skip mode may also be referred to as a second mode.

Hereinafter, the burst mode and the first mode are understood to have the same meaning and the pulse skip mode and the second mode are understood to have the same meaning.

When the energy is required in the channel, the SIMO converter 110 supplies the energy to the plurality of channels by adaptively adjusting a number of pulse generations per clock, for example, a number of pulse shots per clock. The SIMO converter 110 adaptively adjusts the number of pulse generations in a time interval initiated in response to an edge, for example, a rising edge corresponding to the channel. For example, when the energy is still inefficient after one shot of pulse is transferred in a time interval corresponding to one clock, the SIMO converter 110 may supply n shots of pulses until sufficient energy is supplied.

The SIMO converter 110 adaptively adjusts a number of times that a pulse triggering a power transfer to the channel is generated. For example, as shown in a table 150, a light-load voltage may be desired in the first channel. In this example, as shown in a graph 130, the SIMO converter 110 may generate a pulse once per clock such that the light-load voltage desired in the first channel is satisfied. Also, as shown in the table 150, a high load of voltage may be desired in the third channel. In this example, as shown in the graph 130, the SIMO converter 110 may generate a pulse N times per clock such that the high load of voltage desired in the third channel is satisfied.

When each of the channels has sufficient energy, the SIMO converter 110 operates in the second mode to block or skip a generation of a pulse.

The SIMO converter 110 operates based on a slow clock to reduce the standby power and rectify multiple output voltages constantly even when a load current changes.

For example, when the SIMO converter 110 operates in the first mode and the second mode based on the slow clock under a condition requiring a high-load voltage or a high-load current, a ripple may occur in the output voltage. In this example, a frequency of a clock may be adaptively varied to prevent an occurrence of a ripple voltage. The SIMO converter 110 may adjust the frequency of the clock to be decreased under a light-load condition requiring a light-load current and adjust the frequency of the clock to be increased under a high-load condition requiring a high-load current. The SIMO converter 110 may improve voltage regulation characteristics by adjusting the frequency of the clock to be increased in order to reduce an output ripple under the high-load condition.

The following description will be made based on an example in which a SIMO converter provides desired voltages of three channels as an example. However, a number of channels is not limited to the example. The number of channels may vary depending on an example.

Figure 2:
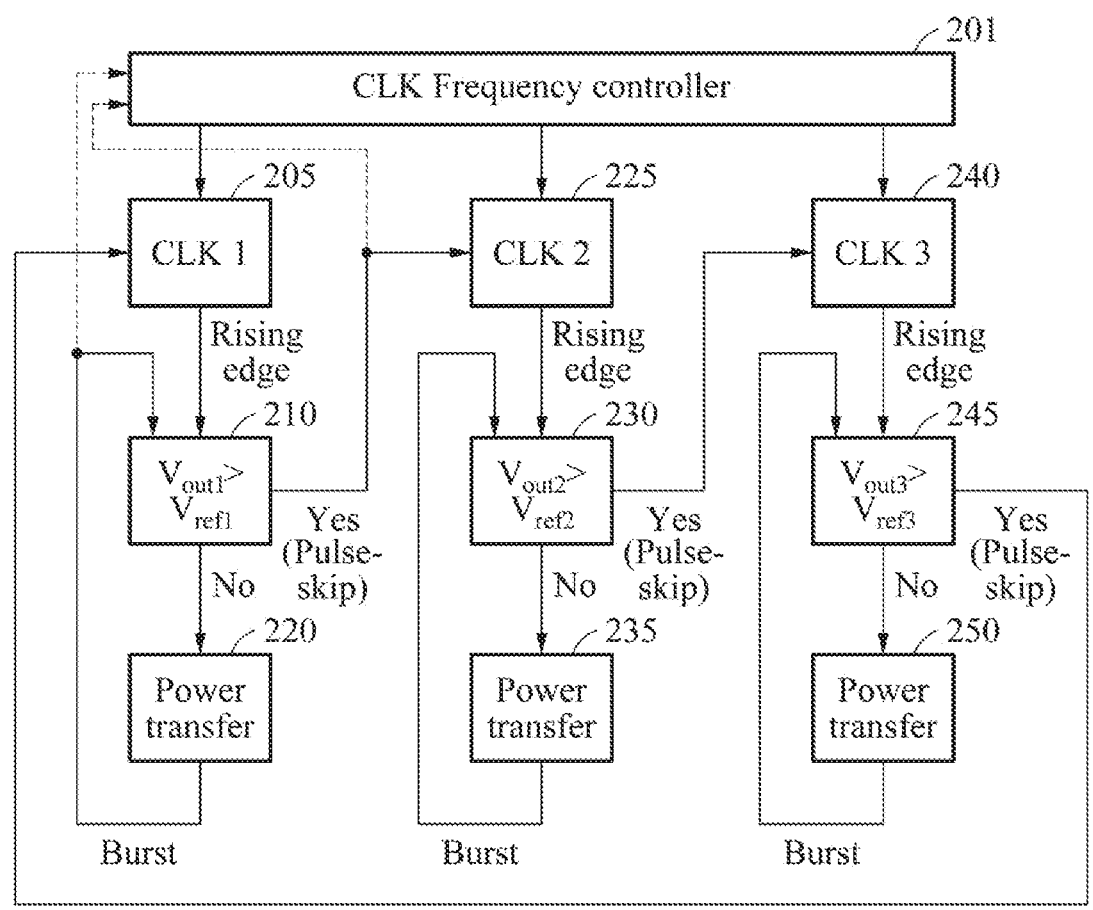
FIG. 2 illustrates an example of a control order of a SIMO converter, in accordance with one or more embodiments.

FIG. 2 illustrates an example of a control order of a SIMO converter. As described above, a plurality of channels of a SIMO converter is sequentially controlled based on a first clock CLK 1, a second clock CLK 2, and a third clock CLK 3. The SIMO converter operates in response to rising edges of the first clock CLK 1, the second clock CLK 2, and the third clock CLK 3.

Referring to FIG. 2, a clock frequency controller 201, for example, a CLK frequency controller of a SIMO converter, supplies a clock corresponding to each channel. When the first clock CLK 1 corresponding to a first channel is supplied from the clock frequency controller 201 in operation 205, the SIMO converter compares a first output voltage $V_{out1}$ corresponding to the first channel to a reference voltage $V_{ref1}$ of the first channel, and determines if the first output voltage $V_{out1}$ is higher than the reference voltage $V_{ref1}$ of the first channel at the rising edge of the first clock in operation 210.

When it is determined that the first output voltage $V_{out1}$ is higher than the reference voltage $V_{ref1}$ of the first channel in operation 210, the SIMO converter blocks a pulse generation according to a pulse skip mode, thereby blocking an additional energy supply to the first output voltage $V_{out1}$. The SIMO converter transfers a pulse skip signal generated by the pulse skip mode to the second clock. Depending on an example, the pulse skip signal may be transferred to the clock frequency controller 201.

When it is determined that the first output voltage $V_{out1}$ is lower than or equal to the reference voltage $V_{ref1}$ of the first channel, the SIMO converter transfers power through an inductor according to a burst mode in operation 220. After transferring the power in operation 220, the SIMO converter compares the first output voltage $V_{out1}$ to the reference voltage $V_{ref1}$ again in operation 210 and repeats a power transfer in operation 220 until the first output voltage $V_{out1}$ is equal to the reference voltage $V_{ref1}$.

The SIMO converter dynamically controls a frequency of the first clock corresponding to the first channel by counting a number of times that an operation is performed in the burst mode and/or a number of times that an operation is performed in the pulse skip mode. When the burst mode occurs at least a preset number of times, the SIMO converter increases a speed (a frequency) of the first clock. When the pulse skip mode occurs at least a preset number of times, the SIMO converter reduces the speed (the frequency) of the first clock. The aforementioned operations may also be performed in the same manner in the second clock and/or the third clock in addition to the first clock depending on an example.

After the first clock is supplied, the second clock CLK 2 is supplied from the clock frequency controller 201 based on a time multiplexing scheme in operation 225. In response to the second clock CLK 2 being supplied, the SIMO converter compares a second output voltage $V_{out2}$ corresponding to the second channel to a reference voltage $V_{ref2}$ of the second channel at the rising edge of the second clock in operation 230.

When it is determined that the second output voltage $V_{out2}$ is higher than the reference voltage $V_{ref2}$ of the second channel in operation 230, the SIMO converter blocks a pulse generation according to a pulse skip mode, thereby blocking an additional energy supply to the second output voltage $V_{out2}$.

When it is determined that the second output voltage $V_{out2}$ is lower than or equal to the reference voltage $V_{ref2}$ of the second channel in operation 230, the SIMO converter transfers power through the inductor in operation 235. After transferring the power, the SIMO converter compares the second output voltage $V_{out2}$ to the reference voltage $V_{ref2}$ again in operation 230 and repeats a power transfer in operation 235 until the second output voltage $V_{out2}$ is equal to the reference voltage $V_{ref2}$.

After the second clock CLK 2 is supplied, the third clock CLK 3 is supplied from the clock frequency controller 201 based on a time multiplexing scheme in operation 240. In response to the third clock CLK 3 being supplied, the SIMO converter compares a third output voltage $V_{out3}$ corresponding to the third channel to a reference voltage $V_{ref3}$ of the third channel at the rising edge of the third clock in operation 245.

When it is determined that the third output voltage $V_{out3}$ is higher than the reference voltage $V_{ref3}$ of the third channel in operation 245, the SIMO converter skips a pulse generation to block an additional energy supply. When it is determined that the third output voltage $V_{out3}$ is lower than or equal to the reference voltage $V_{ref3}$ of the third channel in operation 245, the SIMO converter transfers power through the inductor in operation 250. After transferring the power, the SIMO converter compares the third output voltage $V_{out3}$ to the reference voltage $V_{ref3}$ again in operation 245 and repeats a power transfer in operation 250 until the third output voltage $V_{out3}$ is equal to the reference voltage $V_{ref3}$.

Figure 3:
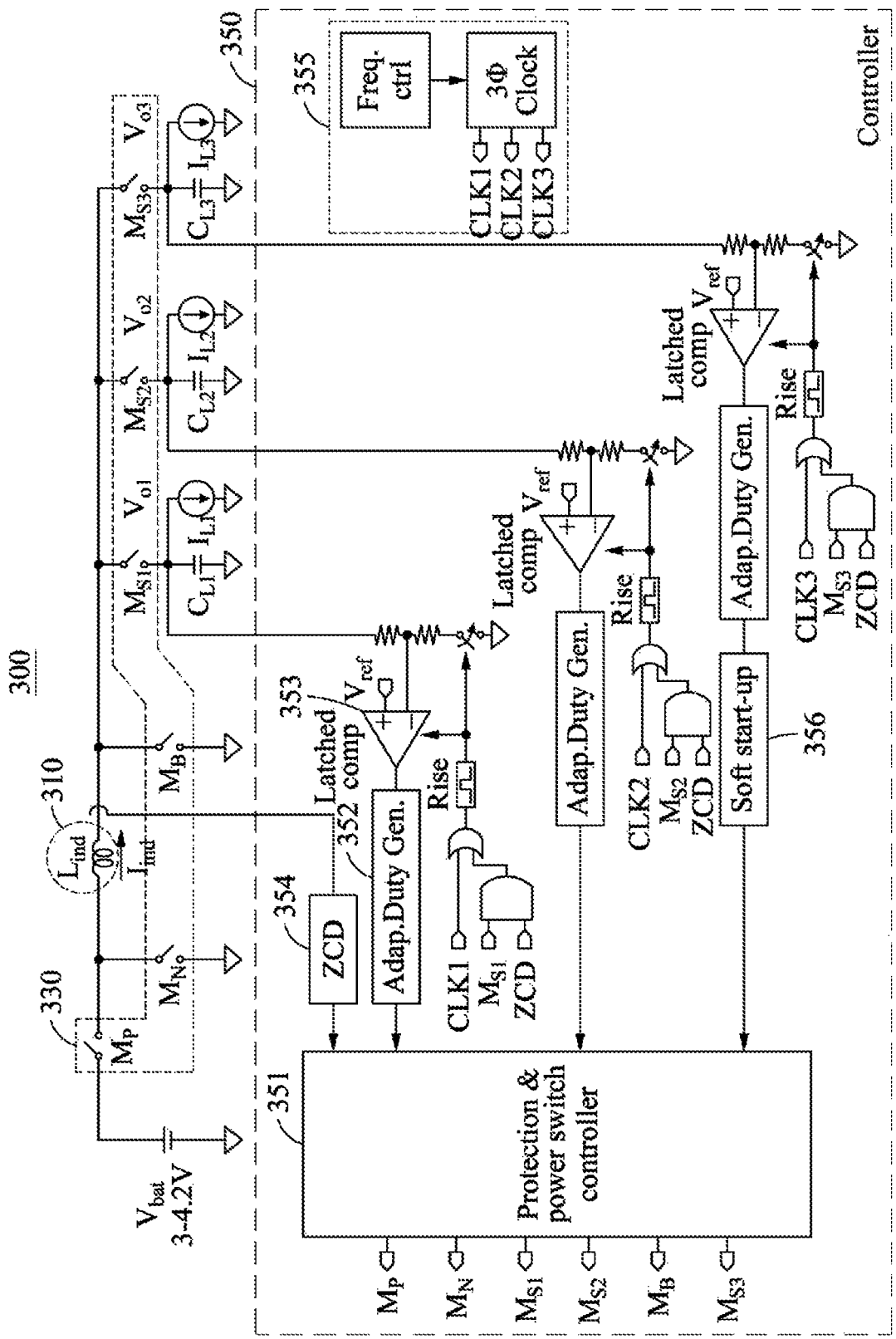
FIG. 3 is a circuit diagram illustrating an example of a SIMO converter, in accordance with one or more embodiments.

FIG. 3 is a circuit diagram illustrating an example of a SIMO converter in accordance with one or more embodiments. Referring to FIG. 3, a SIMO converter 300 includes a single inductor 310, for example, $L_{ind}$, a switching unit 330, and a control logic 350.

The single inductor 310 supplies voltages desired by a plurality of channels of a converter.

The switching unit 330 includes first switches $M_{S1}$, $M_{S2}$, and $M_{S3}$ for selecting the plurality of channels, and second switches $M_P$, $M_N$, and $M_B$ for controlling a flow of an inductor current $I_{ind}$ flowing in the single inductor 310, that is, an inductor current generated due to a power transfer through the single inductor. The first switches $M_{S1}$, $M_{S2}$, and $M_{S3}$ connect output ports (for example, ports outputting output voltages $V_{O1}$, $V_{O2}$, and $V_{O3}$) of the plurality of channels and the single inductor 310 in series. Among the first switches $M_{S1}$, $M_{S2}$, and $M_{S3}$, a 1-$1^{st}$ switch, for example, the first switch $M_{S1}$ is a switch for selecting a first channel, a 1-$2^{nd}$ switch, for example, the first switch $M_{S2}$ is a switch for selecting a second channel, and a 1-$3^{rd}$ switch, for example, the first switch $M_{S3}$ is a switch for selecting a third channel.

The second switches $M_P$, $M_N$, $M_B$ include a 2-$1^{st}$ switch $M_P$, a 2-$2^{nd}$ switch $M_N$, and a 2-$3^{rd}$ switch $M_B$. One end of the 2-$1^{st}$ switch $M_P$ is connected to an input port ($V_{bat}$-side) of the SIMO converter 300 and the other end of the 2-$1^{st}$ switch $M_P$ is connected to one end of the single inductor 310. One end of the 2-$2^{nd}$ switch $M_N$ is connected to the one end of the single inductor 310 and the other end of the 2-$2^{nd}$ switch $M_N$ is grounded, for example, connected to a ground GND. One end of the 2-$3^{rd}$ switch $M_B$ is connected to the other end of the single inductor 310 and the other end of the 2-$3^{rd}$ switch $M_B$ is grounded.

The SIMO converter 300 uses the single inductor 310, for example, the inductor current $I_{ind}$ of the single inductor 310 to provide the required voltages of the plurality of channels. The SIMO converter 300 provides the required voltages of the plurality of channels based on clocks having different phases using a time multiplexing scheme.

The control logic 350 compares an output voltage of a channel corresponding to a control target to a reference voltage of the channel based on a clock of the channel such that the SIMO converter 300 operates in one of the first mode and the second mode described above.

The control logic 350 controls switches, for example, the first switches $M_P$, $M_N$, and $M_B$ and the second switches $M_{S1}$, $M_{S2}$, $M_{S3}$ of the switching unit 330 based on clocks, for example, CLK1, CLK2, and CLK3 corresponding to the plurality of channels.

The control logic 350 includes a switch controller 351, for example, a protection & power switch controller, adaptive duty generators 352, comparators 353, for example, latched comparators, a zero crossing detector (ZCD) 354, a clock controller 355, and a soft start-up circuit 356.

The switch controller 351 selects a first switch for a corresponding channel from the first switches $M_{S1}$, $M_{S2}$, and $M_{S3}$ in response to a pulse being generated and controls the second switches $M_P$, $M_N$, and $M_B$ based on a sequence for generating a desired voltage of the channel. A method in which the switch controller 351 controls the switches $M_P$, $M_N$, $M_B$, $M_{S1}$, $M_{S2}$, and $M_{S3}$ in response to a pulse being generated will be described in detail with reference to FIGS. 5A through 13B.

The adaptive duty generator 352 dynamically controls a duty-ratio of the second switches $M_P$, $M_N$, and $M_B$ based on an input voltage of the SIMO converter 300. An operation of the adaptive duty generator will be described in detail with reference to FIGS. 14 through 16.

The comparator 353 latches the output voltage of the channel at an edge, for example, a rising edge of the clock corresponding to the channel. The comparator 353 compares the latched output voltage to the reference voltage of the channel.

The ZCD 354 resets the current $I_{ind}$ of the single inductor 310 after the power transfer that is triggered due to the generation of the pulse.

The clock controller 355 supplies clocks having different phases to correspond to the plurality of channels based on a time multiplexing scheme. An operation of the clock controller 355 will be described in detail with reference to FIGS. 17 through 20.

The soft start-up circuit 356 dynamically controls a frequency of the clock corresponding to the channel based on a load in the channel. An operation of the soft start-up circuit will be described in detail with reference to FIGS. 21A and 21B.

Figure 4:
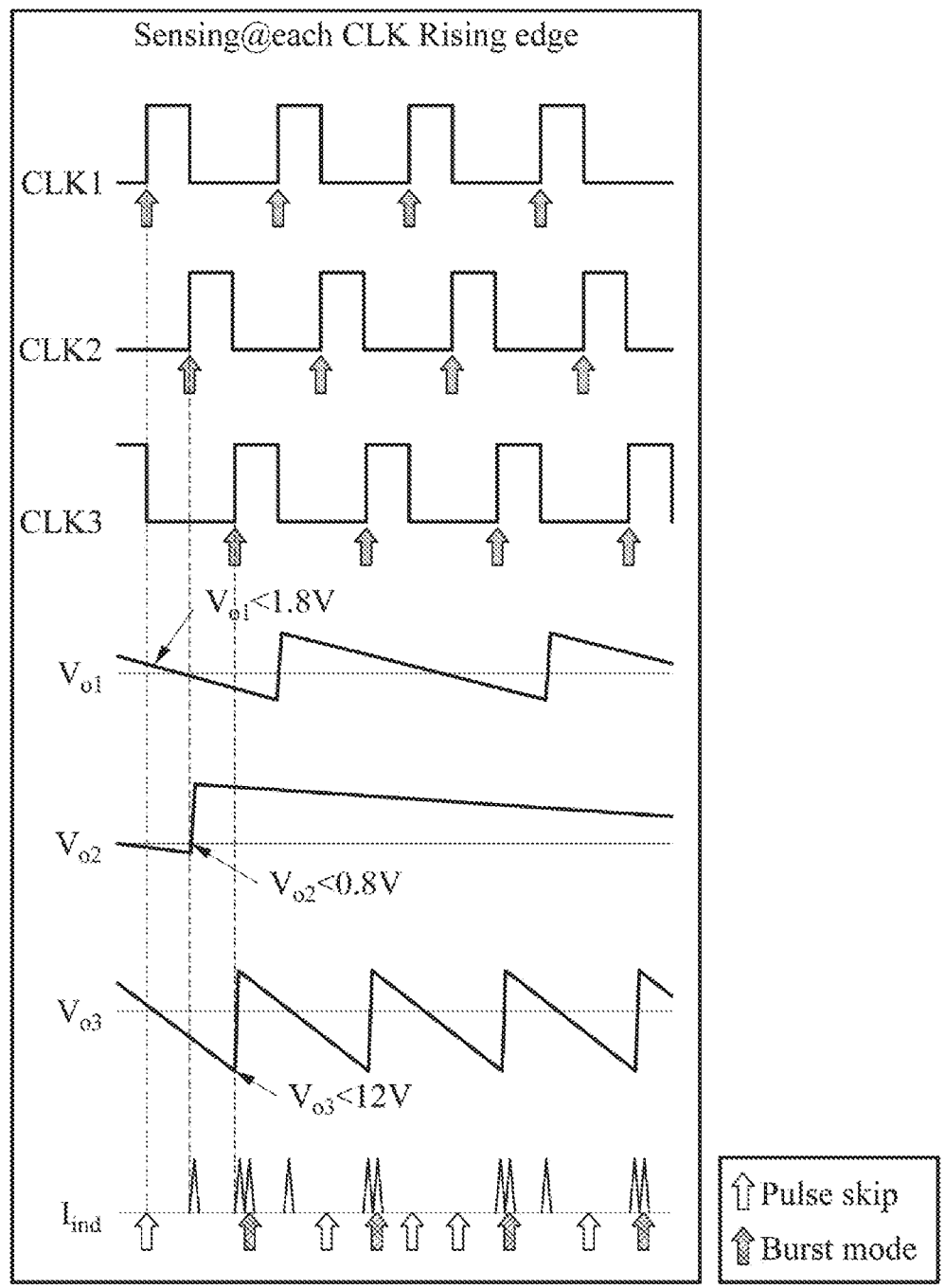
FIG. 4 illustrates an example of a method of operating a SIMO converter in a first mode or a second mode based on a clock, in accordance with one or more embodiments.

FIG. 4 illustrates an example of a method of operating a SIMO converter in a first mode or a second mode based on a clock. FIG. 4 illustrates a first clock CLK 1 of a first channel, a second clock CLK 2 of a second channel, and a third clock CLK 3 of a third channel. The first clock CLK 1, the second clock CLK 2, and the third clock CLK 3 are generated based on a common clock or a global clock. For example, a rising edge of the first clock CLK 1 is generated at a first rising edge of the common clock, a rising edge of the second clock CLK 2 is generated at a second rising edge of the common clock, and a rising edge of the third clock CLK 3 is generated at a third rising edge of the common clock. The common clock is divided in the aforementioned manner to generate the first clock CLK 1 though the third clock CLK 3.

FIG. 4 illustrates an example in which an output voltage $V_{O1}$ of the first channel is lower than a reference voltage, for example, 1.8 V of the first channel at the rising edge of the first clock CLK 1, an example in which an output voltage $V_{O2}$ of the second channel is lower than a reference voltage, for example, 0.8 V of the second channel at the rising edge of the second clock CLK 2, and an example in which an output voltage $V_{O3}$ of the third channel is lower than a reference voltage, for example, 12.0 V of the third channel at the rising edge of the third clock CLK 3.

A SIMO converter compares the output voltage $V_{O1}$ of the first channel to the reference voltage (for example, 1.8 V) of the first channel in response to the first clock CLK 1 of the first channel being supplied. For example, when the output voltage $V_{O1}$ of the first channel is 1.9 V, the output voltage $V_{O1}$ of the first channel is higher than the reference voltage (for example, 1.8 V). In this example, the SIMO converter blocks a generation of a pulse according to the second mode.

After the first clock CLK 1 is supplied, the second clock CLK is supplied based on a time multiplexing scheme. The SIMO converter compares the output voltage $V_{O2}$ of the second channel to the reference voltage (for example, 0.8 V) of the channel. When the output voltage $V_{O2}$ of the second channel is 0.7 V, the output voltage $V_{O2}$ is lower than the reference voltage (for example, 0.8 V) of the second channel. In this example, the SIMO converter repetitively generates the pulse until the output voltage $V_{O2}$ (0.7 V) of the second channel is higher than the reference voltage (for example, 0.8 V) of the second channel according to the first mode. For example, the output voltage $V_{O2}$ (0.7 V) of the second channel may be increased to be higher than the reference voltage (for example, 0.8 V) through a pulse generation performed once. Thereafter, the SIMO converter blocks the pulse generation according to the second mode.

After the second clock CLK 2 is supplied, the third clock CLK 3 is supplied based on the time multiplexing scheme. The SIMO converter compares the output voltage $V_{O3}$ of the third channel to the reference voltage (for example, 12.0 V) of the third channel at the rising edge of the third clock CLK 3. When the output voltage $V_{O3}$ of the third channel is 8.0 V, the output voltage $V_{O3}$ of the third channel is lower than the reference voltage (for example, 12.0 V) of the third channel. In this example, the SIMO converter repetitively generates the pulse until the output voltage $V_{O3}$ (8.0 V) of the third channel is higher than the reference voltage (for example, 12.0 V) according to the first mode. For example, the output voltage $V_{O3}$ (8.0 V) of the third channel is increased to be higher than the reference voltage (for example, 12.0 V) through the pulse generation performed twice. Thereafter, the SIMO converter blocks the pulse generation according to the second mode.

An operation of a switching unit corresponding to each channel in an example in which sequential clocks are supplied to the channel based on the time multiplexing scheme will be described in detail with reference to FIGS. 5A through 13B.

Figure 5A:
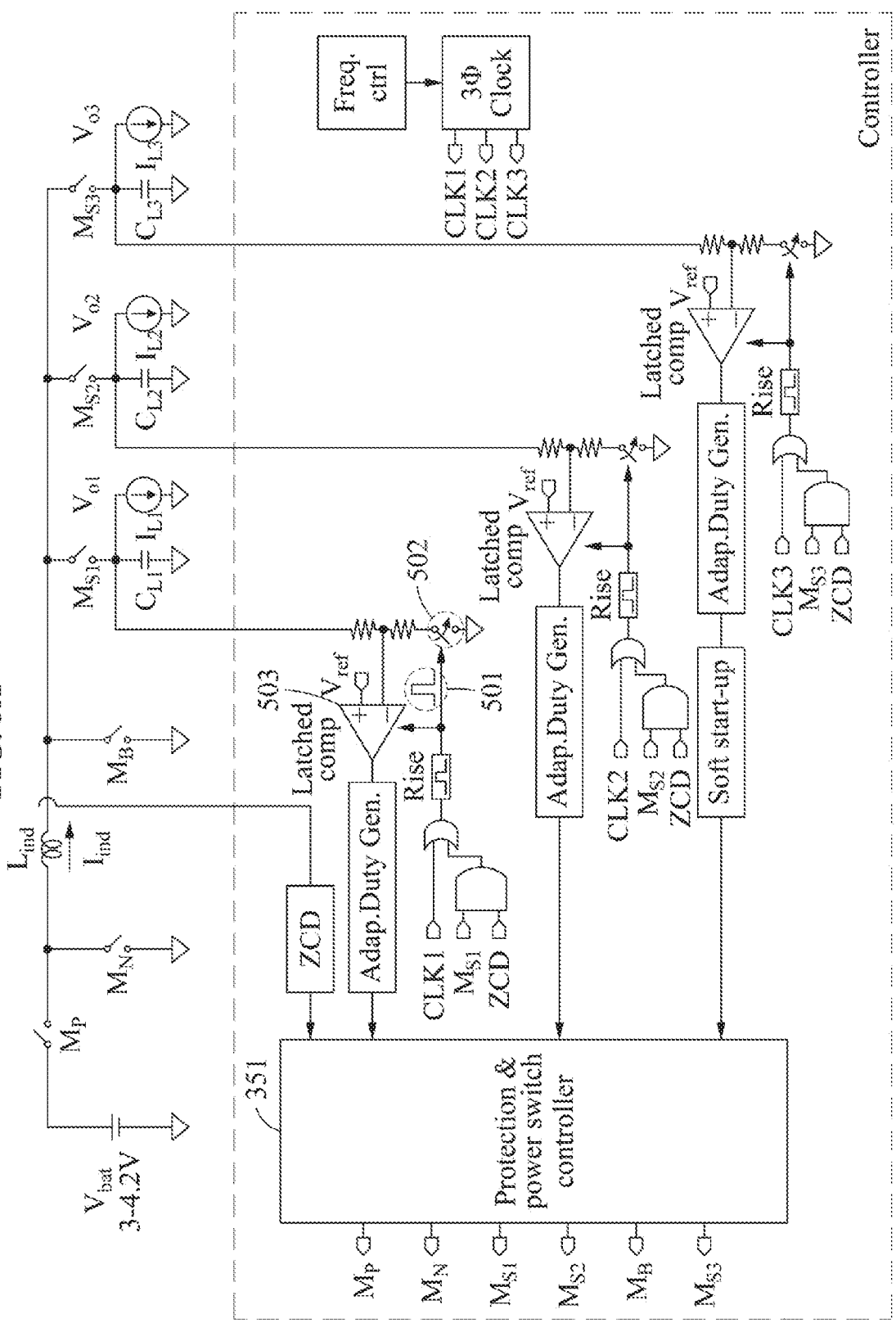
FIGS. 5A and 5B illustrate examples of an operation in an example in which a first clock CLK1 corresponding to a first channel is applied in a SIMO converter, in accordance with one or more embodiments.
Figure 5B:
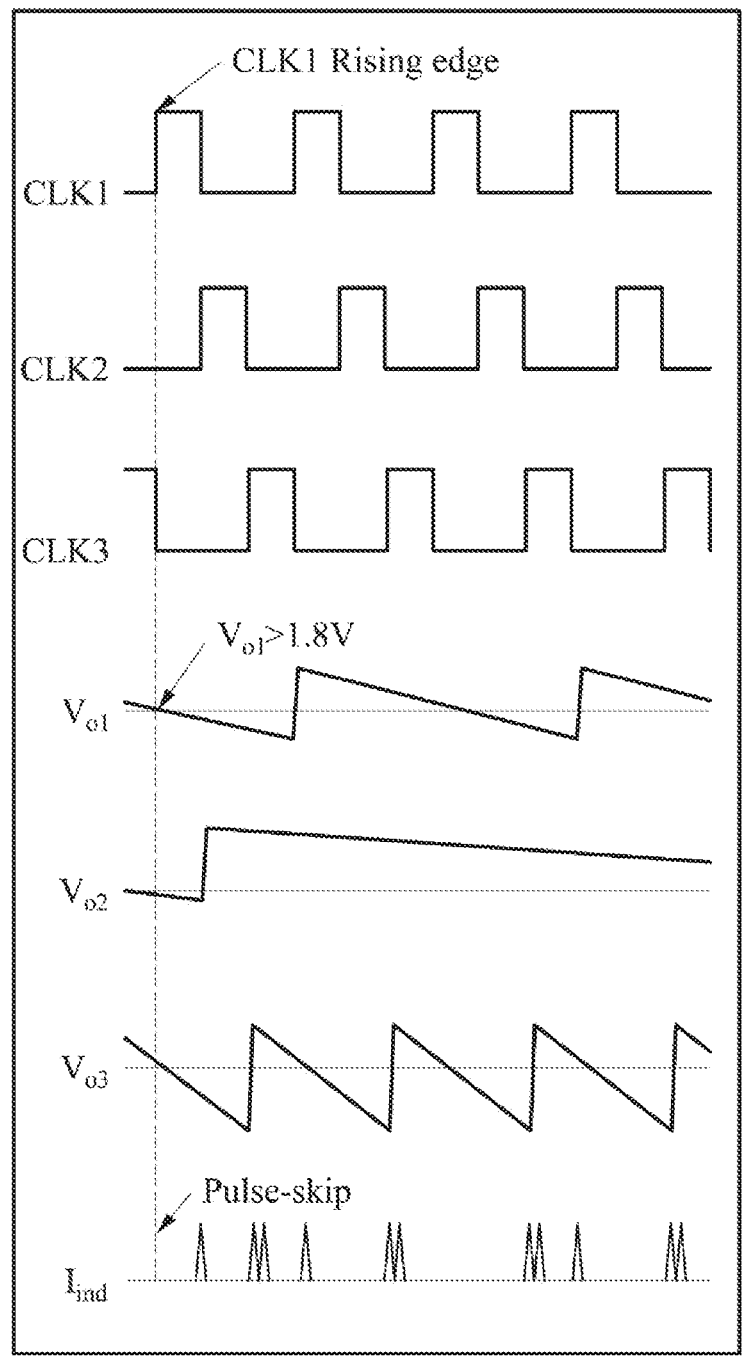

FIGS. 5A and 5B illustrate examples of an operation in an example in which a first clock CLK1 corresponding to a first channel is applied in a SIMO converter. Referring to FIG. 5A, a signal 501 is generated in response to a rising edge of a first clock CLK 1 being detected. Referring to FIG. 5B, an output voltage $V_{O1}$ of the first channel is detected at a point in time in which the rising edge of the first clock CLK 1 corresponding to the first channel occurs.

When the signal 501 is generated in response to the rising edge of the first clock CLK 1 being detected, a switch 502 is turned on by the signal 501 such that the output voltage $V_{O1}$ of the first channel is transferred to a first comparator 503.

The first comparator 503 compares the output voltage $V_{O1}$ of the first channel to a reference voltage (for example, 1.8 V) of the first channel. A circuit for comparing the output voltage $V_{O1}$ of the first channel to the reference voltage of the first channel may be designed in various ways. A common reference voltage $V_{ref}$ and a voltage divider may be used. For example, the output voltage $V_{O1}$ of the first channel may be divided using a voltage divider of a ratio corresponding to the reference voltage (for example, 1.8 V) of the first channel. The voltage divider includes a plurality of sensing resistors. The first comparator 503 compares the common reference voltage $V_{ref}$ and a voltage-divided output voltage, thereby comparing the output voltage $V_{O1}$ of the first channel and the reference voltage (for example, 1.8 V) of the first channel.

The output voltage $V_{O1}$ of the first channel is, for example, 1.9 V as illustrated in FIG. 5B. In this example, since the output voltage $V_{O1}$ (1.9 V) is higher than the reference voltage (1.8 V) of the first channel, the SIMO converter generates a pulse skip signal to block the pulse generation according to the second mode. In response to the pulse skip signal, the switch controller 351 does not generate a control signal for controlling a switching unit. In this example, a power transfer to a single inductor $L_{ind}$ is blocked, so that an inductor current $I_{ind}$ is not generated.

FIGS. 6A through 8B illustrate examples of an operation in an example in which a second clock CLK2 corresponding to a second channel is applied in a SIMO converter. FIGS. 6A through 8B illustrate an operation performed in an example in which a second clock CLK 2 is supplied to a SIMO converter based on a time multiplexing scheme after a first clock CLK 1 is supplied similar to the example of FIGS. 5A and 5B.

Figure 6A:
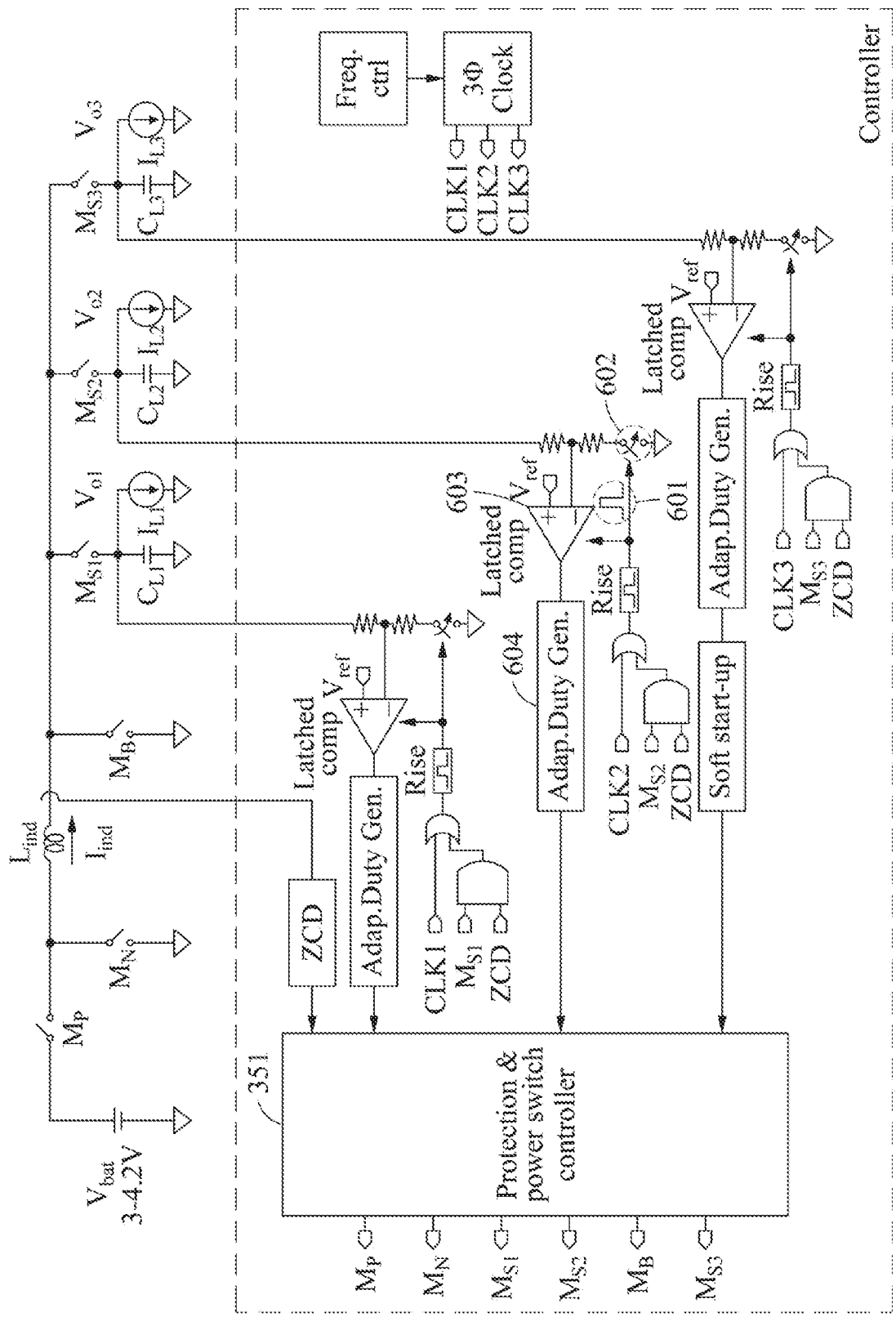
FIGS. 6A through 8B illustrate examples of an operation in an example in which a second clock CLK2 corresponding to a second channel is applied in a SIMO converter, in accordance with one or more embodiments.
Figure 6B:
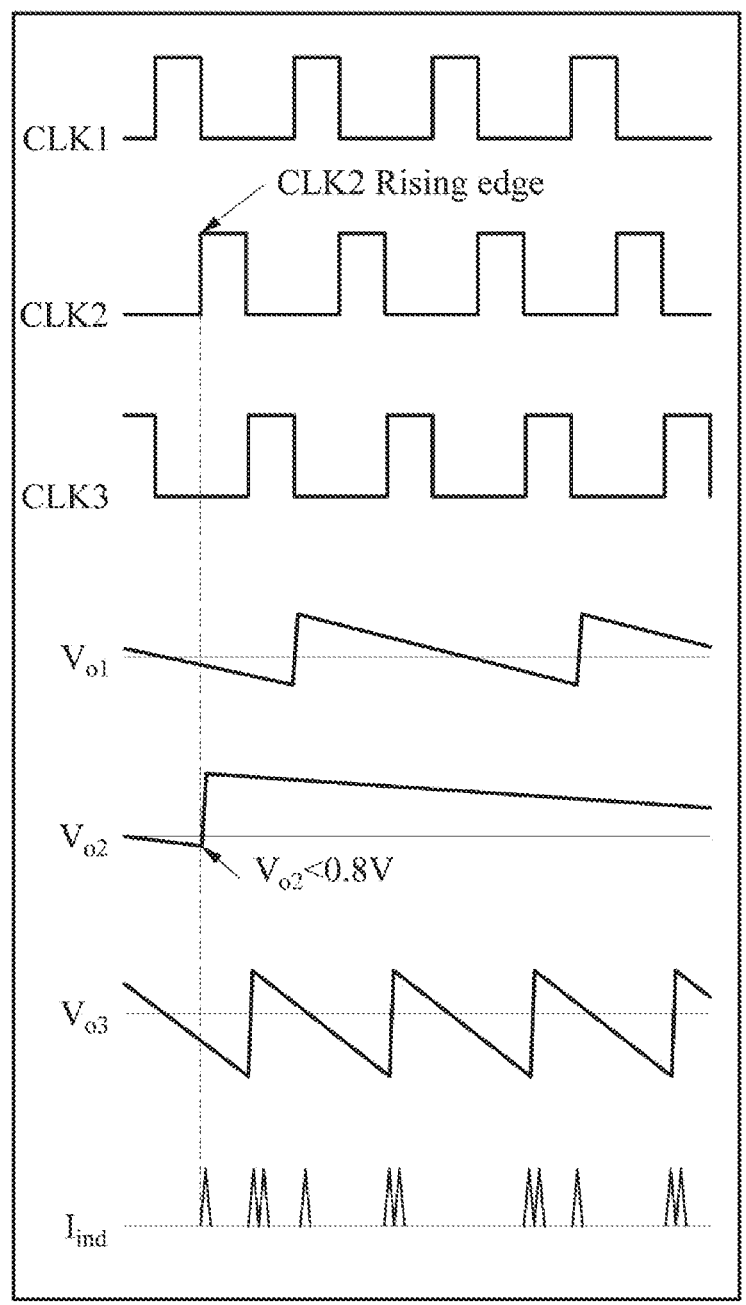

Referring to FIG. 6A, a signal 601 is generated in response to a rising edge of the second clock CLK 2 being detected. Referring to FIG. 6B, an output voltage $V_{O1}$ of the second channel is detected at a point in time in which the rising edge of the second clock CLK 2 corresponding to the second channel occurs.

When the signal 601 is generated in response to the rising edge of the second clock CLK 2 being detected, a switch 602 is turned on by the signal 601 such that the output voltage $V_{O2}$ of the second channel is transferred to a second comparator 603.

The second comparator 603 compares the output voltage $V_{O2}$ of the second channel to a reference voltage (for example, 0.8 V) of the second channel. As an example, the output voltage $V_{O2}$ of the second channel may be divided using a voltage divider of a ratio corresponding to the reference voltage (for example, 0.8 V) of the second channel. The second comparator 603 compares a common reference voltage $V_{ref}$ and a voltage-divided output voltage, thereby comparing the output voltage $V_{O2}$ of the second channel and the reference voltage (for example, 0.8 V) of the second channel.

The output voltage $V_{O2}$ of the second channel is, for example, 0.7 V as illustrated in FIG. 6B. In this example, since the output voltage $V_{O2}$ (0.7 V) of the second channel is lower than the reference voltage (0.8 V), the SIMO converter generates a pulse according to a first mode to increase the output voltage $V_{O2}$ of the second channel as illustrated in FIG. 6B. The SIMO converter repetitively generates the pulse until the output voltage $V_{O2}$ (0.7 V) of the second channel is higher than the reference voltage (for example, 0.8 V) according to the first mode.

When the output voltage $V_{O2}$ (0.7V) of the second channel is lower than the reference voltage (for example, 0.8V) as illustrated in FIG. 6B, the second comparator 603 transmits a signal to a second adaptive duty generator 604.

Figure 7A:
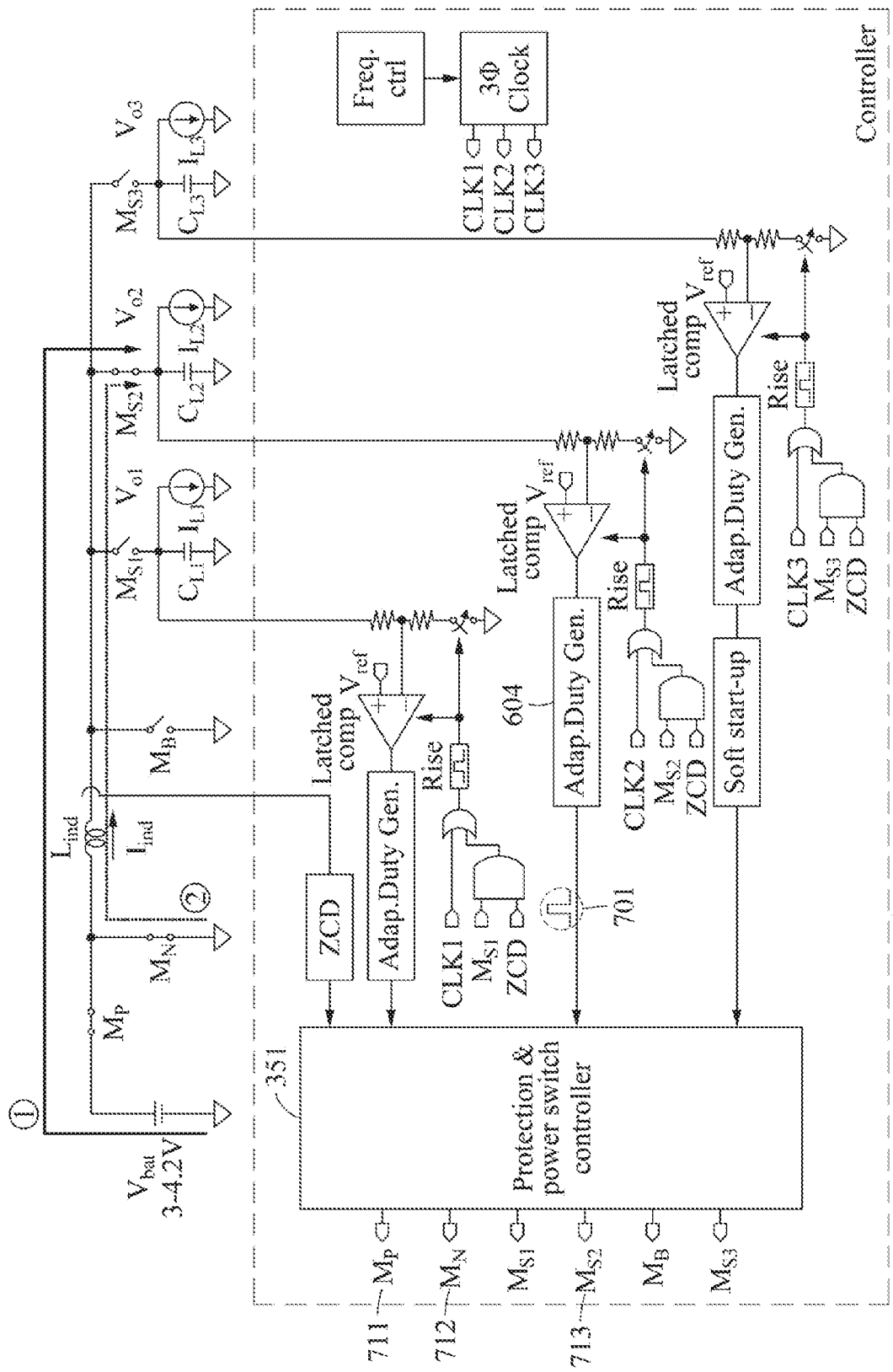

The second adaptive duty generator 604 having received the signal transmitted from the second comparator 603 generates a signal 701 as illustrated in FIG. 7A. The switch controller 351 dynamically controls a duty-ratio of second switches $M_P$, $M_N$, and $M_B$ based on the signal 701 received from the second adaptive duty generator 604. The signal 701 generated by the second adaptive duty generator 604 is used to dynamically control the duty-ratio of the second switches $M_P$, $M_N$, and $M_B$ based on, for example, an input voltage $V_{bat}$ of the SIMO converter such that the inductor current $I_{ind}$ is built-up and freewheeled.

The switch controller 351 controls the switching unit 330 using the signal 701 as illustrated in FIG. 7A. The switch controller 351 having received the signal 701 transmits a signal 711 for the second switch $M_P$ and a signal 713 for a 1-$2^{nd}$ switch $M_{S2}$ corresponding to the second channel such that the second switch $M_P$ and the 1-$2^{nd}$ switch $M_{S2}$ are turned on as indicated by an arrow ①. In this example remaining switches are off. Through this, the input voltage $V_{bat}$ of the SIMO converter is supplied to the output voltage $V_{O2}$ of the second channel through the 1-$2^{nd}$ switch $M_{S2}$. Thereafter, the switch controller 351 transmits a signal 712 for a 2-$2^{nd}$ switch, for example, the second switch $M_N$ and a signal 713 for the 1-$2^{nd}$ switch $M_{S2}$ such that the 2-$2^{nd}$ switch $M_N$ and the 1-$2^{nd}$ switch $M_{S2}$ are turned on as indicated by an arrow ②. In this example remaining switches are off. Through this, a voltage obtained due to the inductor current $I_{ind}$ may also be supplied to the output voltage $V_{O2}$ of the second channel.

Figure 7B:
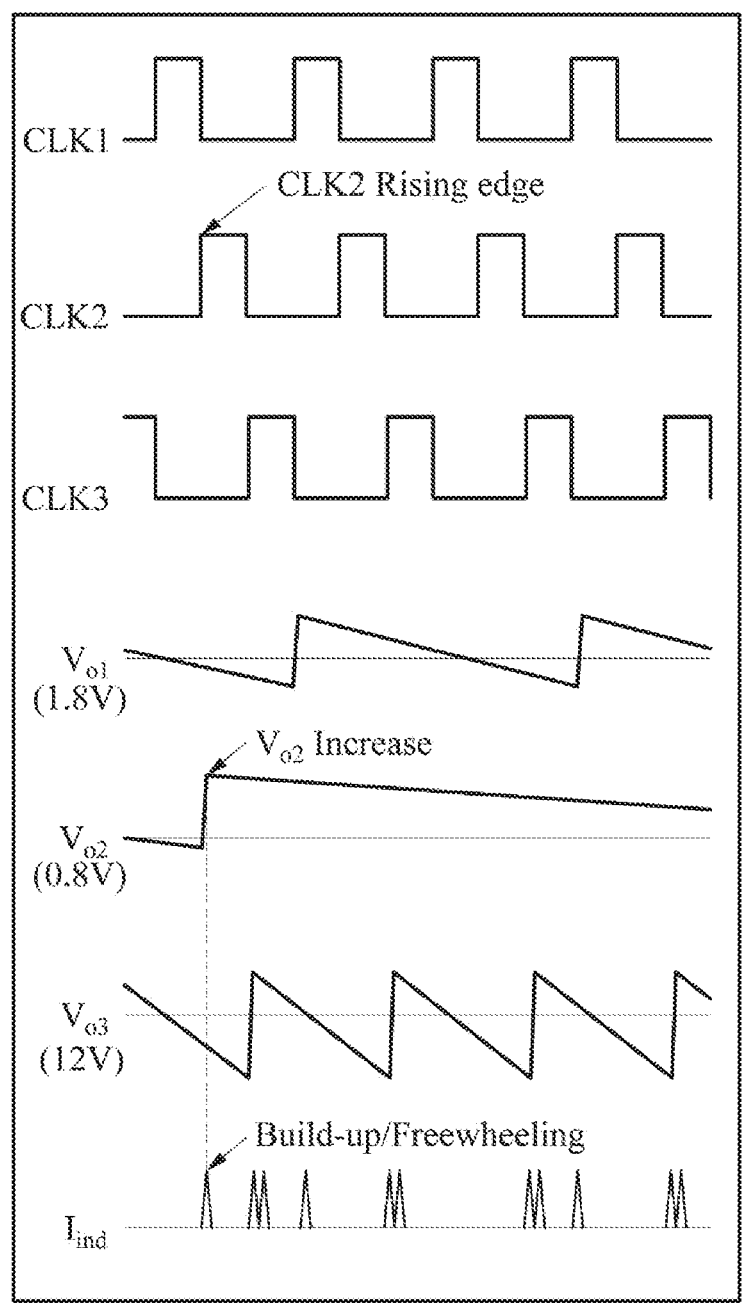

In response to the voltage being supplied to the output voltage $V_{O2}$ of the second channel, the output voltage $V_{O2}$ of the second channel is increased to be higher than or equal to the reference voltage (for example, 0.8 V) as illustrated in FIG. 7B.

Figure 8A:
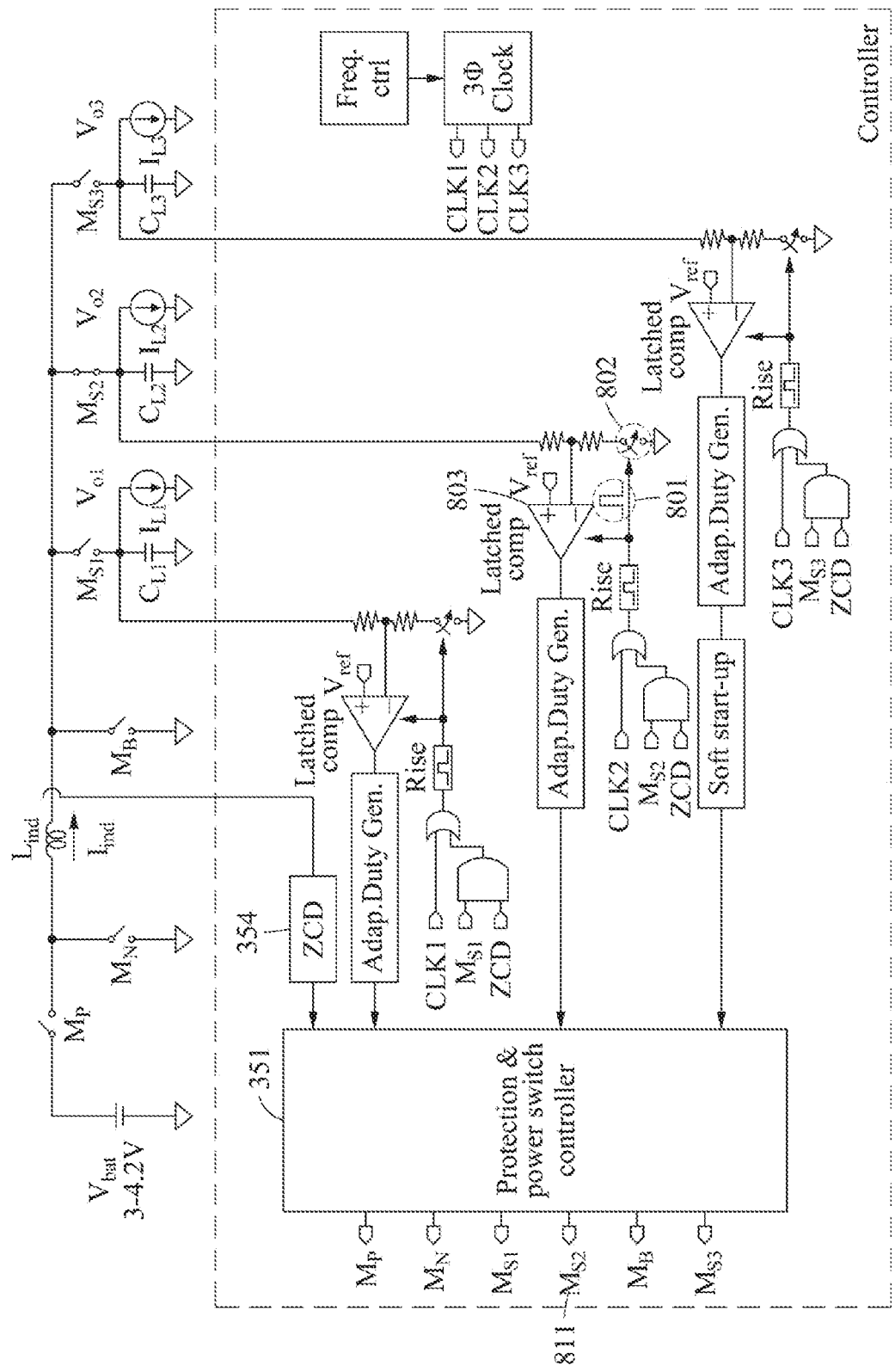
Figure 8B:
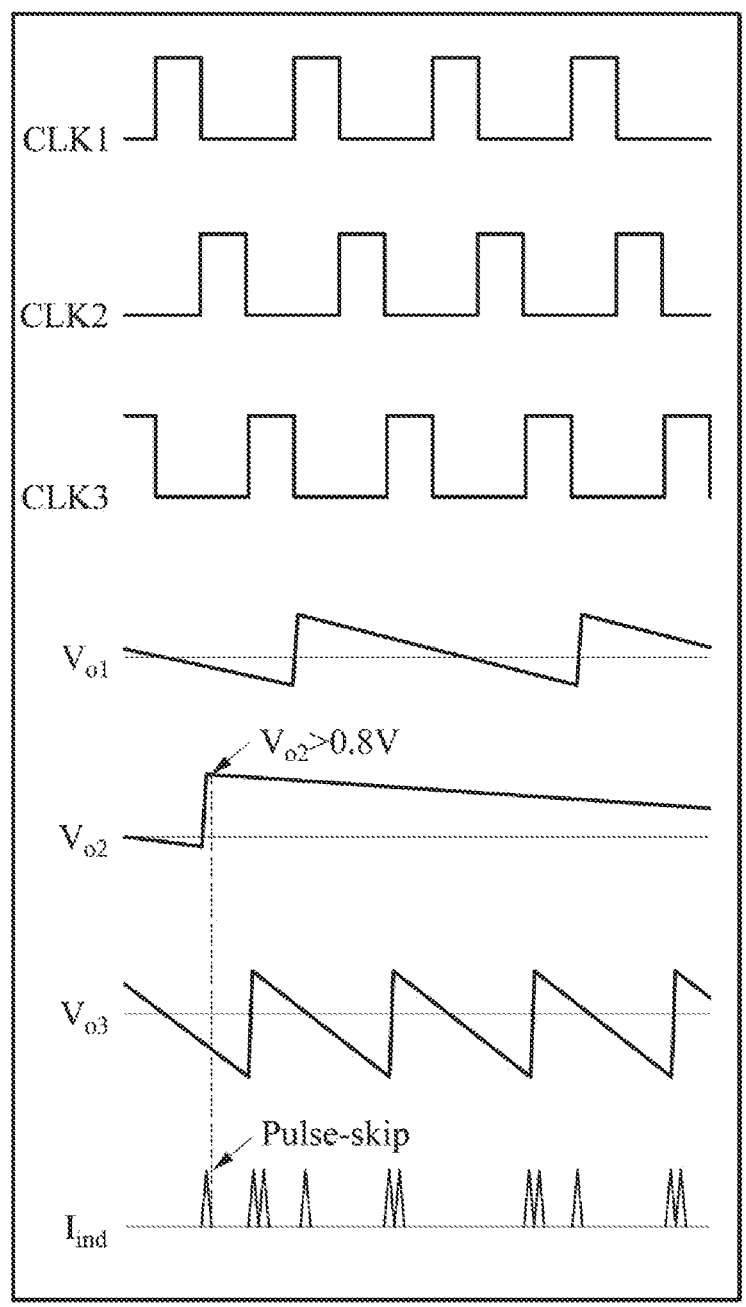

After power is transferred to the output voltage $V_{O1}$ of the second channel based on the signal 701, the SIMO converter resets a current $L_{ind}$ of a single inductor using the ZCD 354 as illustrated in FIG. 8A. The ZCD 354 allows the inductor current $L_{ind}$ to be 0 and prevents a counter electromotive force being applied to a battery. The inductor current $L_{ind}$ becomes zero by the ZCD 354 in the second mode as illustrated in FIG. 8B.

Thereafter, as illustrated in FIG. 8A, a signal 801 is generated by the output voltage $V_{O2}$ of the second channel and the ZCD 354. The switch controller 351 transmits a signal 811 for the 1-$2^{nd}$ switch $M_{S2}$ in response to the signal 801. The 1-$2^{nd}$ switch $M_{S2}$ is turned on in response to the signal 811 such that the output voltage $V_{O2}$ of the second channel is transferred to a second comparator 803. As a comparison result of the second comparator 803, the increased output voltage $V_{O2}$ of the second channel is higher than the reference voltage (for example, 0.8 V) as illustrated in FIG. 8B, the SIMO converter operates in the second mode.

FIGS. 9A through 13B illustrate examples of an operation in an example in which a third clock CLK3 corresponding to a third channel is applied in a SIMO converter. FIGS. 9A through 13B illustrate an operation performed in an example in which a third clock CLK 3 is supplied to a SIMO converter based on a time multiplexing scheme after a second clock CLK 2 is supplied.

Figure 9A:
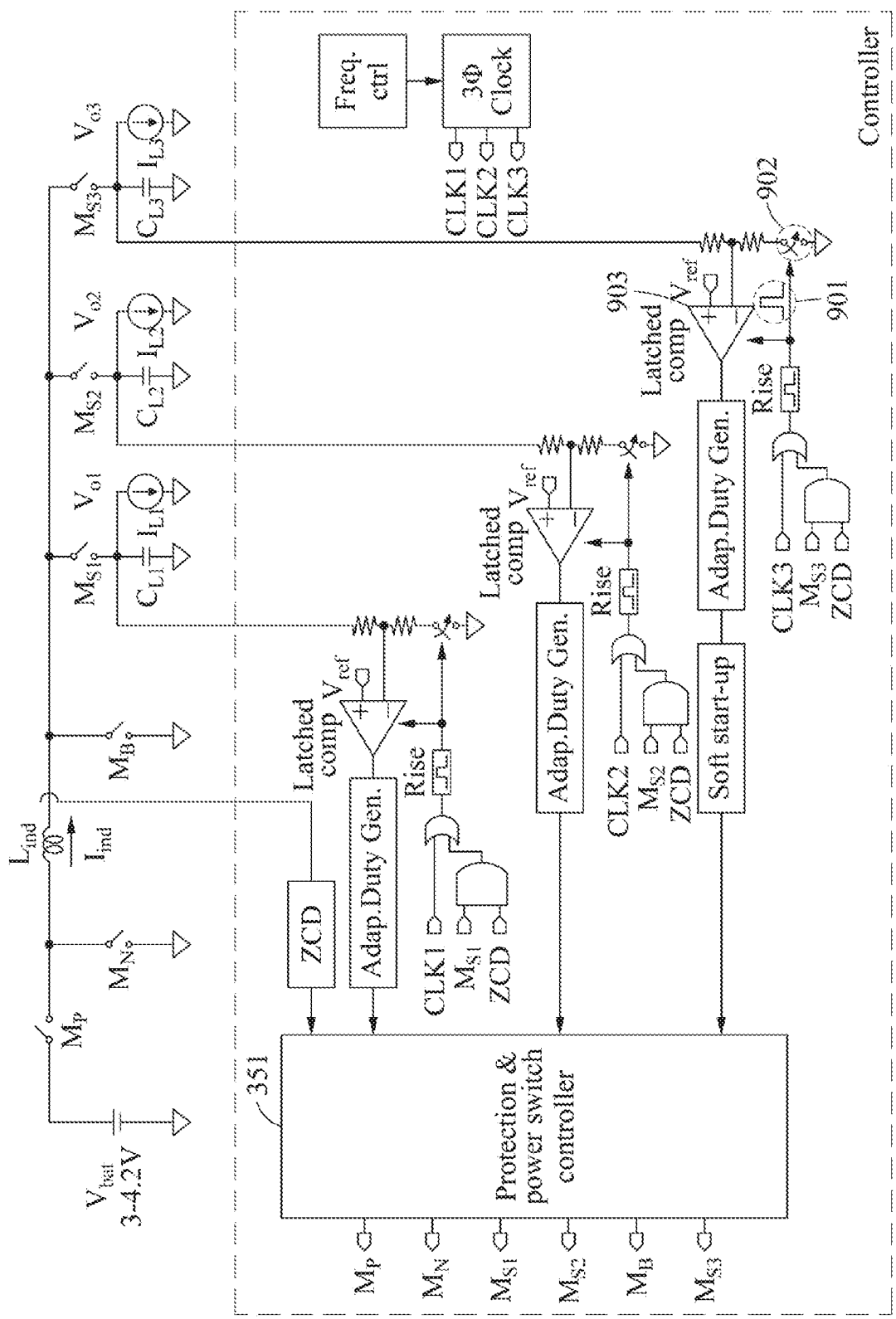
FIGS. 9A through 13B illustrate examples of an operation in an example in which a third clock CLK3 corresponding to a third channel is applied in a SIMO converter, in accordance with one or more embodiments.
Figure 9B:
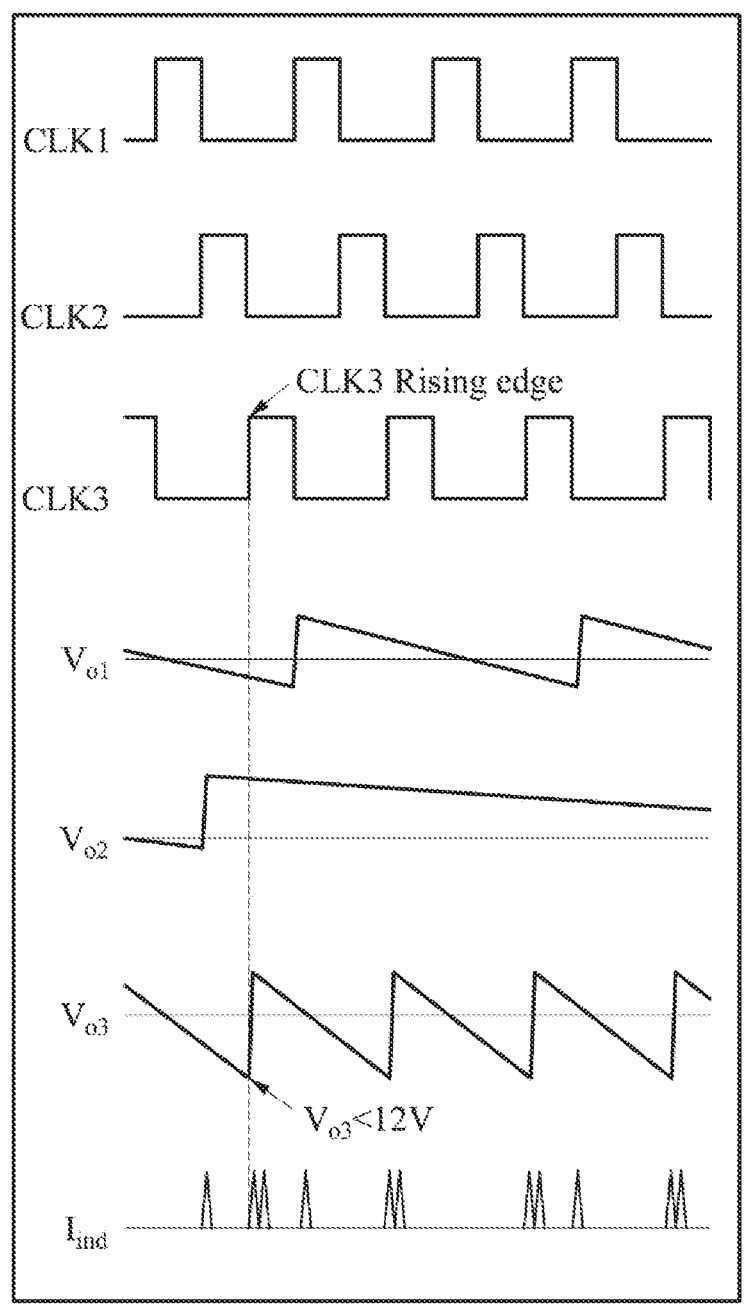

Referring to FIG. 9A, a signal 901 is generated in response to a rising edge of the third clock CLK 3 being detected. Referring to FIG. 9B, an output voltage $V_{O3}$ of the third channel is detected at a point in time in which the rising edge of the third clock CLK 3 corresponding to the third channel occurs.

When the signal 901 is generated in response to the rising edge of the third clock CLK 3 being detected, a switch 902 is turned on by the signal 901 such that the output voltage $V_{O3}$ of the third channel is transferred to a third comparator 903.

The third comparator 903 compares the output voltage $V_{O3}$ of the third channel to a reference voltage (for example, 12 V) of the third channel. As an example, the output voltage $V_{O3}$ of the third channel may be divided using a voltage divider of a ratio corresponding to the reference voltage (for example, 12 V) of the third channel. The third comparator 903 compares a common reference voltage $V_{ref}$ and a voltage-divided output voltage, thereby comparing the output voltage $V_{O3}$ of the third channel and the reference voltage (for example, 12 V) of the third channel.

For example, as illustrated in FIG. 9B, the output voltage $V_{O3}$ may be 8 V which is lower than the reference voltage of 12 V.

Figure 10A:
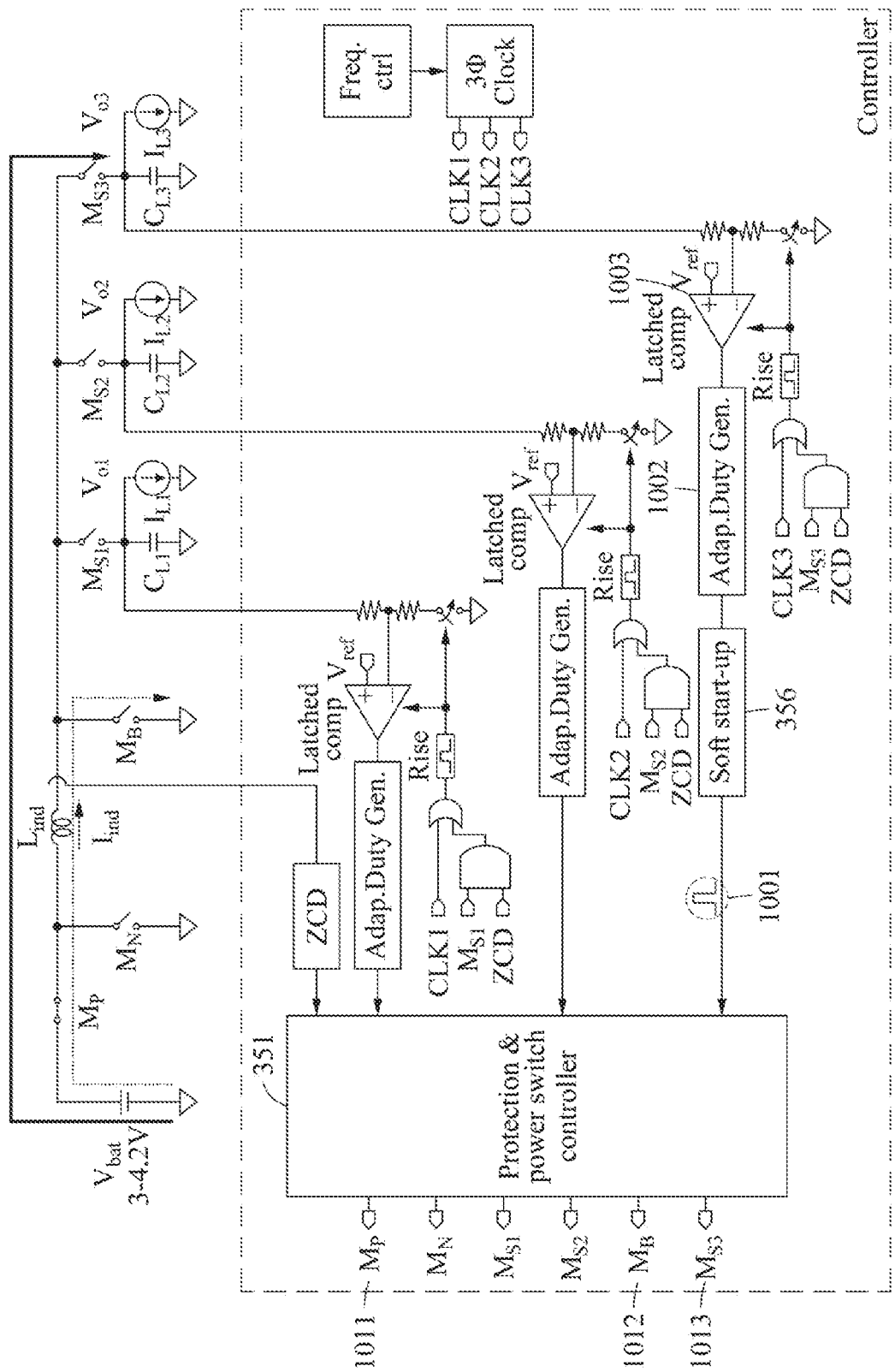

In this example, since the output voltage $V_{O3}$ (8 V) of the third channel is lower than the reference voltage (for example, 12 V), the SIMO converter generates a signal 1001 according to a first mode to increase the output voltage $V_{O3}$ of the third channel as illustrated in FIG. 10A. The signal 1001 may be a signal generated through a third adaptive duty generator 1002 and the soft start-up circuit 356.

A process of generating the signal 1001 is as follows, for example.

The SIMO converter repetitively generates a pulse to increase the output voltage $V_{O3}$ (8 V) of the third channel until the output voltage $V_{O3}$ is higher than the reference voltage (for example, 12 V) according to the first mode. When it is determined that the output voltage $V_{O3}$ (8 V) of the third channel is lower than the reference voltage (for example, 12 V), a third comparator 1003 transfers a signal to the third adaptive duty generator 1002. The signal may be generated as the signal 1001 via the third adaptive duty generator 1002 and the soft start-up circuit 356. The soft start-up circuit 356 generates the signal 1001 and transfers the signal 1001 to the switch controller 351 to prevent an abrupt increase in current, for example, in rush current. The switch controller 351 having received the signal 1001 dynamically controls a duty-ratio of second switches, for example, a 2-1$^{st}$ switch M$_P$, a 2-2$^{nd}$ switch M$_N$, and a 2-3$^{rd}$ switch M$_B$.

The switch controller 351, having received the signal 1001, transmits a signal 1011 for the 2-1$^{st}$ switch M$_P$, a signal 1012 for the 2-3$^{rd}$ switch M$_B$, and a signal 1013 for a 1-3$^{rd}$ switch M$_{S3}$. The switches (the 2-1$^{st}$ switch M$_P$, the 2-3$^{rd}$ switch M$_B$, and the 1-3$^{rd}$ switch M$_{S3}$) having received the corresponding signals are turned on. An input voltage V$_{bat}$ of the SIMO converter is grounded through the 2-3$^{rd}$ switch M$_B$, and only a voltage due to an inductor current I$_{ind}$ is supplied to the output voltage V$_{O3}$ of the third channel through the 1-3$^{rd}$ switch M$_{S3}$.

Figure 10B:
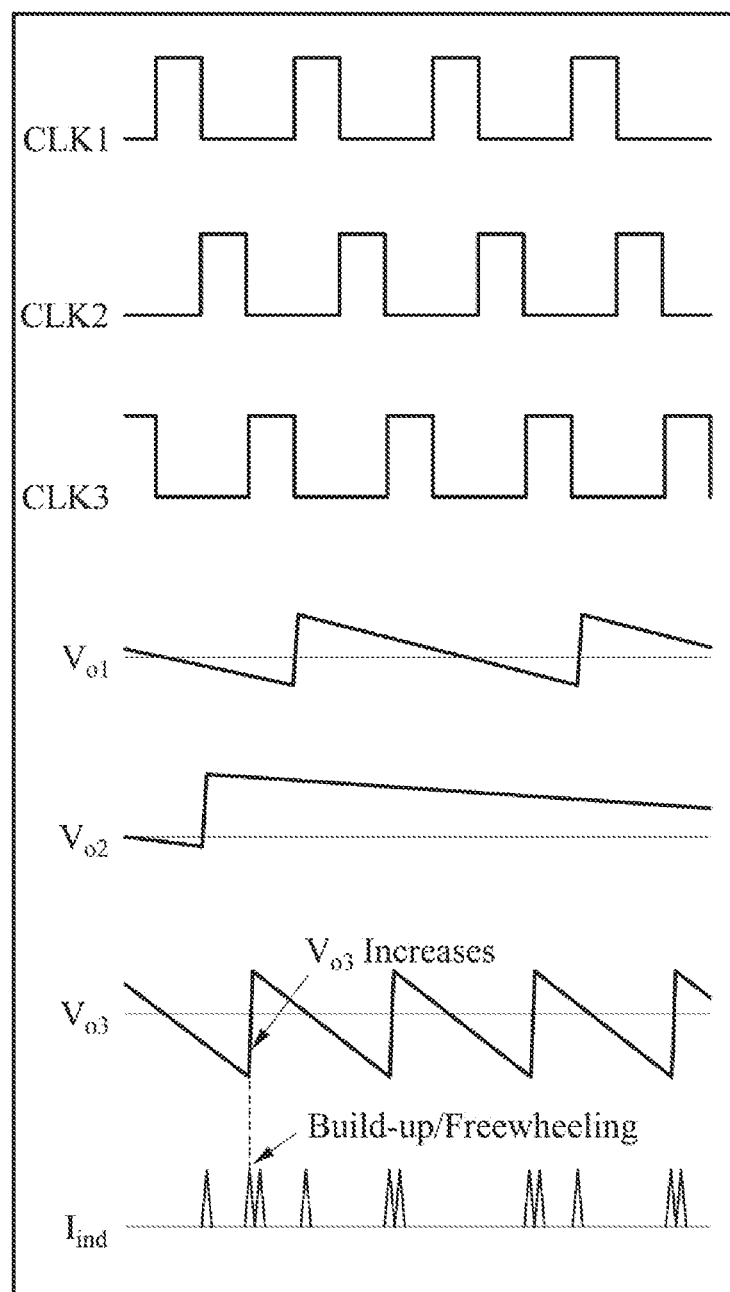

As such, the soft start-up circuit 356 increases the output voltage V$_{O3}$ of the third channel to reach a level of the input voltage V$_{bat}$ (for example, 3 V to 4.2 V) of the SIMO converter, and then increases the output voltage V$_{O3}$ of the third channel to be equal to the reference voltage (for example, 12 V) through a boosting operation so as to prevent an occurrence of ripple current due to an abrupt increase in an amount of current. The soft start-up circuit 356 increases the output voltage V$_{O3}$ of the third channel as illustrated in FIG. 10B. An operation of the soft start-up circuit 356 will be further described with reference to FIGS. 21A and 21B.

Figure 11A:
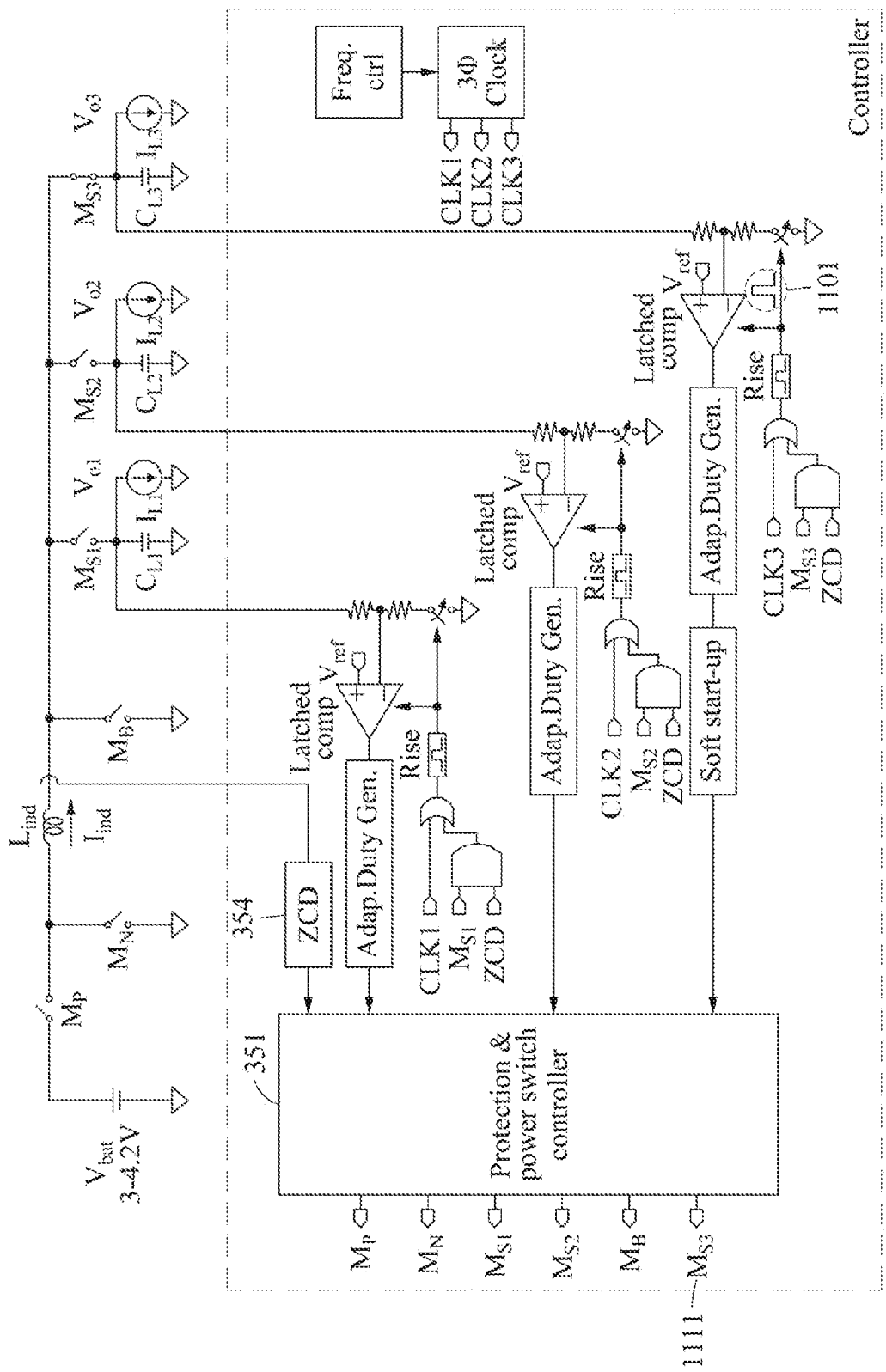

After transferring a power to the output voltage V$_{O3}$ of the third channel based on the signal 1001, the SIMO converter transfers an inductor current of a single inductor to the ZCD 354, thereby resetting the inductor current to be zero as illustrated in FIG. 11A.

Thereafter, a signal 1101 is generated based on the ZCD 354 and the output voltage V$_{O3}$ of the third channel. The switch controller 351, having received the signal 1101, transfers a signal 1111 for the 1-3$^{rd}$ switch M$_{S3}$. The 1-3$^{rd}$ switch M$_{S3}$ is turned on in response to the signal 1111. The output voltage V$_{O3}$ of the third channel is transferred to the third comparator 1003. As a comparison result of the third comparator 1003, since the increased output voltage V$_{O3}$ of the third channel is lower than the reference voltage (for example, 12 V) as illustrated in FIG. 11B, the SIMO converter operates in the first mode.

Figure 11B:
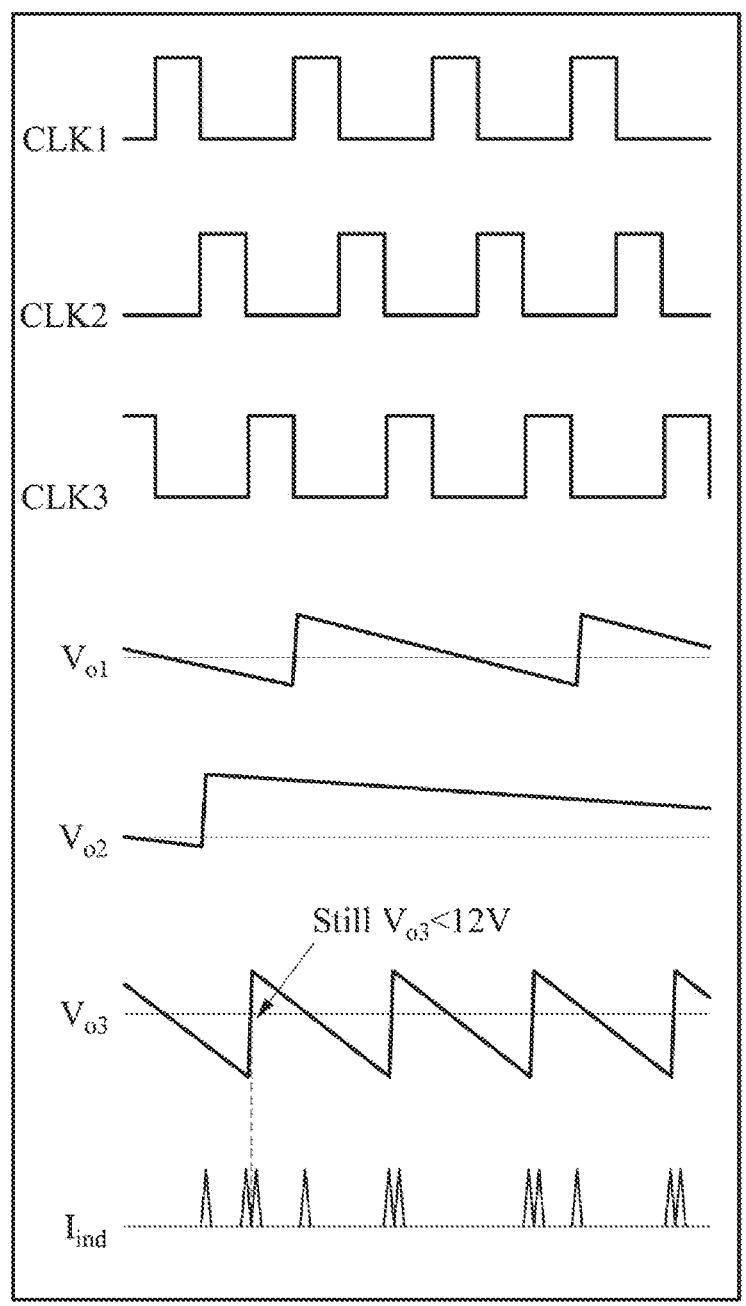
Figure 12A:
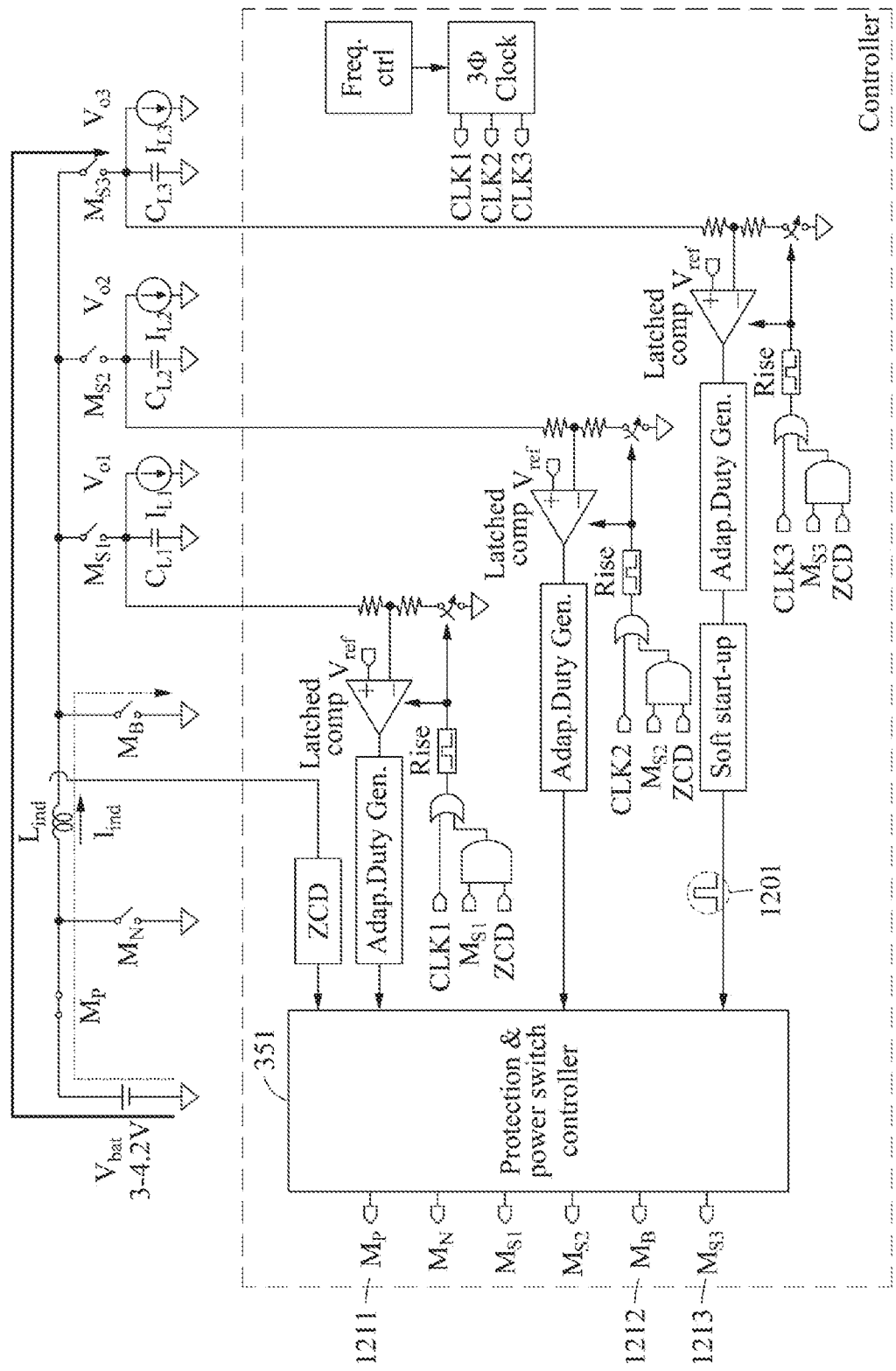
Figure 12B:
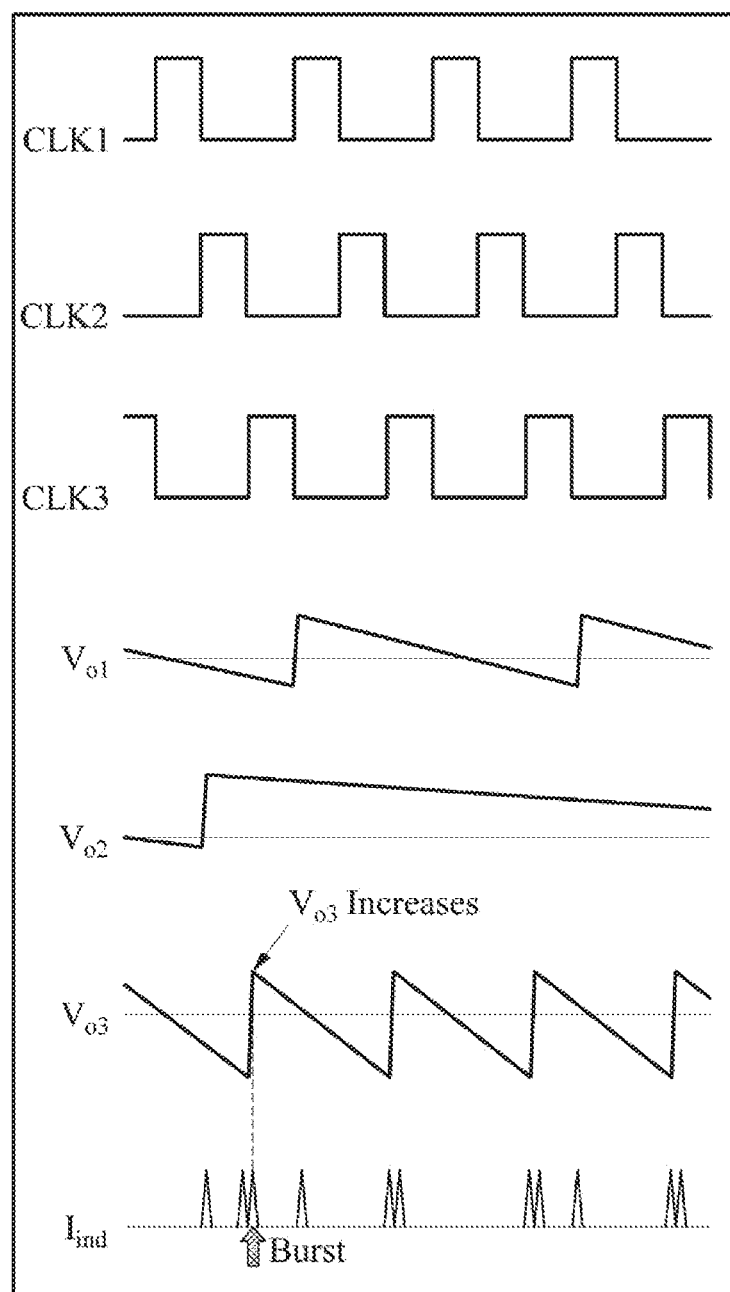

As a comparison result of the third comparator 1003, when it is determined that the output voltage V$_{O3}$ (8 V) of the third channel is still lower than the reference voltage (for example, 12 V) as illustrated in FIG. 11B, the SIMO converter generates a signal 1201 according to the first mode to increase the output voltage V$_{O3}$ of the third channel as illustrated in FIG. 12A. An inductor current generated in the first mode increases the output voltage V$_{O3}$ of the third channel as illustrated in FIG. 12B.

The switch controller 351 having received the signal 1201 transmits a signal 1211 for the 2-1$^{st}$ switch M$_P$, a signal 1212 for the 2-3$^{rd}$ switch M$_B$, and a signal 1213 for the 1-3$^{rd}$ switch M$_{S3}$. The switches (the 2-1$^{st}$ switch M$_P$, the 2-3$^{rd}$ switch M$_B$, and the 1-3$^{rd}$ switch M$_{S3}$) having received the corresponding signals are turned on and remaining switches are turned off. In this example, the input voltage V$_{bat}$ of the SIMO converter is grounded through the 2-3$^{rd}$ switch M$_B$, and only a voltage due to the inductor current I$_{ind}$ is supplied to the output voltage V$_{O3}$ of the third channel through the 1-3$^{rd}$ switch M$_{S3}$.

Figure 13A:
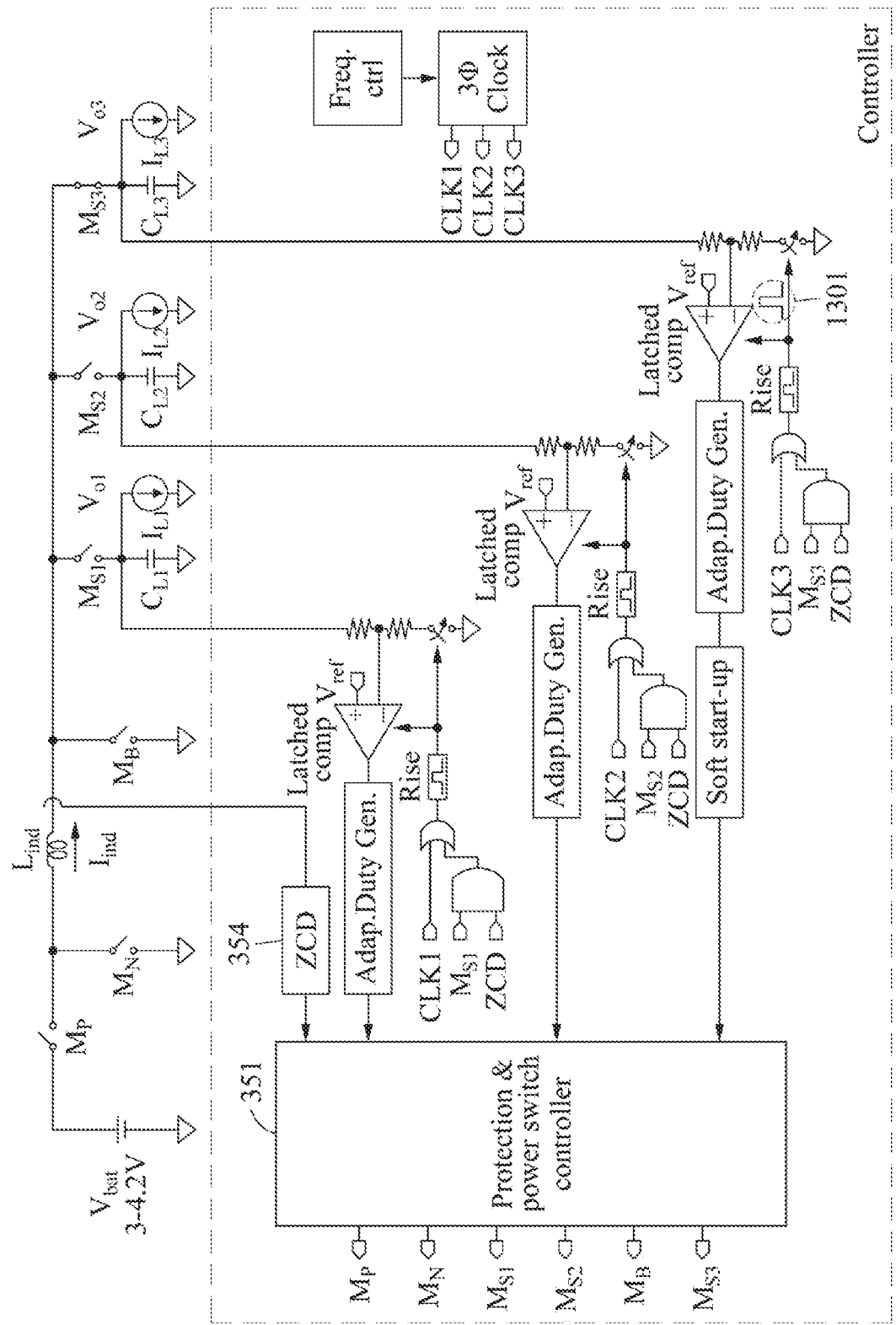

After transferring a power to the output voltage V$_{O3}$ of the third channel based on the signal 1201, the SIMO converter transfers an inductor current of a single inductor to the ZCD 354, thereby resetting the inductor current to be zero as illustrated in FIG. 13A.

Figure 13B:
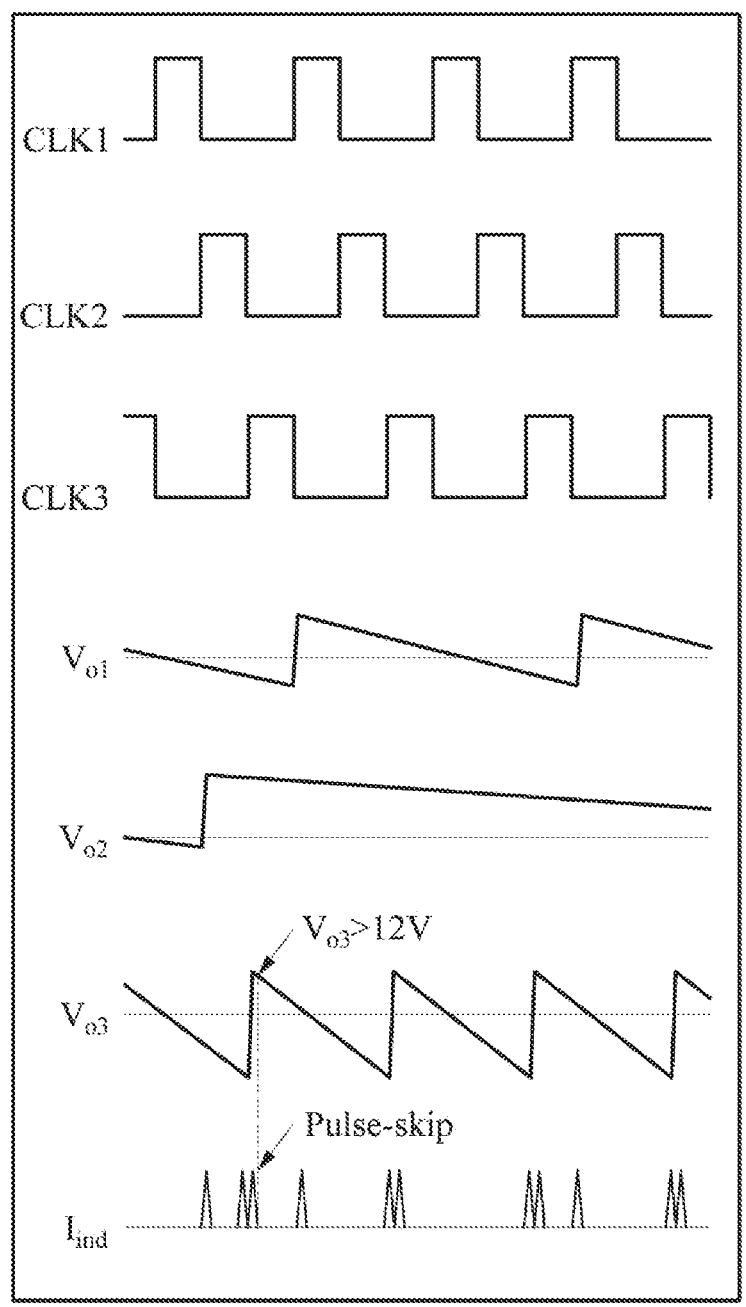

Thereafter, a signal 1301 is generated based on the ZCD 354 and the output voltage V$_{O3}$ of the third channel. In this example, since the increased output voltage V$_{O3}$ of the third channel is higher than the reference voltage (for example, 12 V) as illustrated in FIG. 13B, the SIMO converter operates in the second mode.

Figure 14:
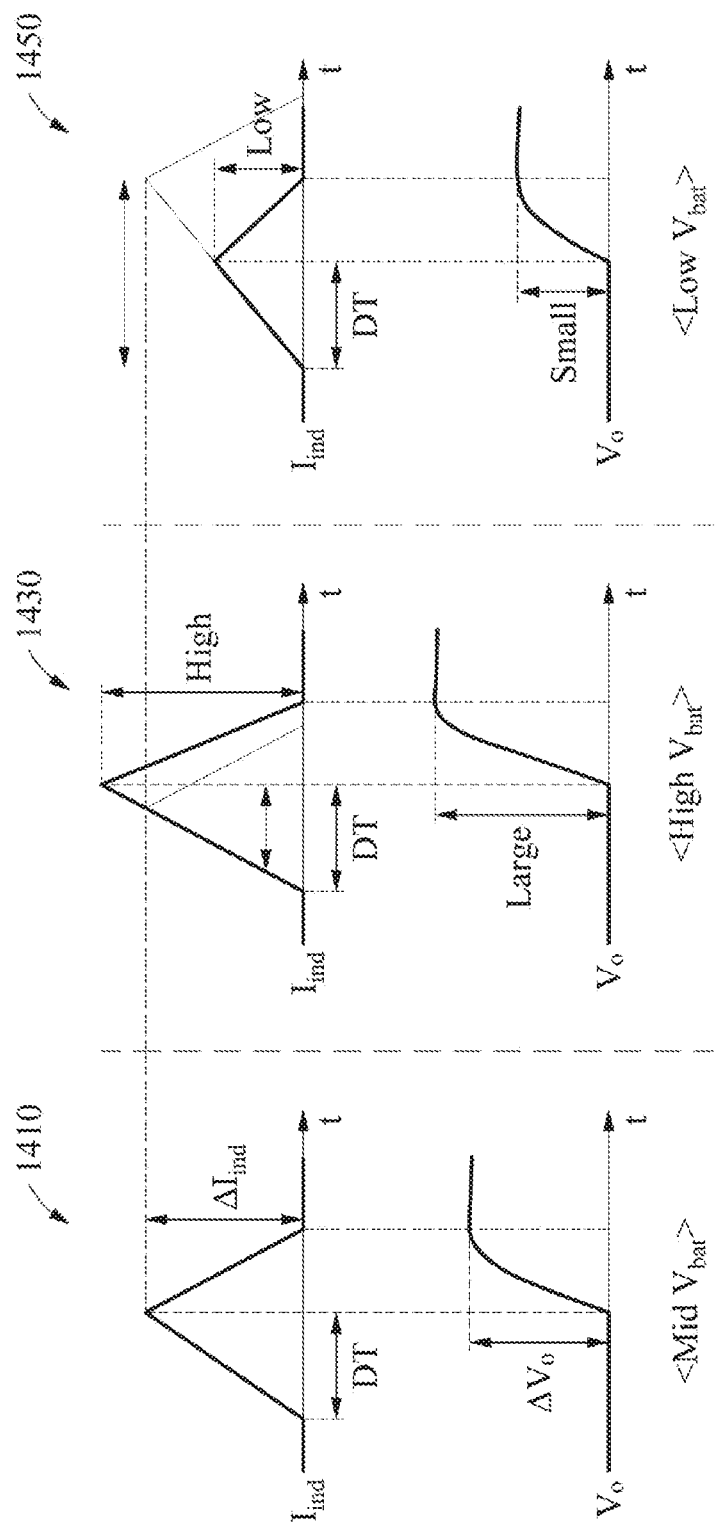
FIGS. 14 through 16 illustrate examples of a method of adaptively controlling a duty-ratio in an adaptive duty generator of a SIMO converter, in accordance with one or more embodiments.
Figure 15A:
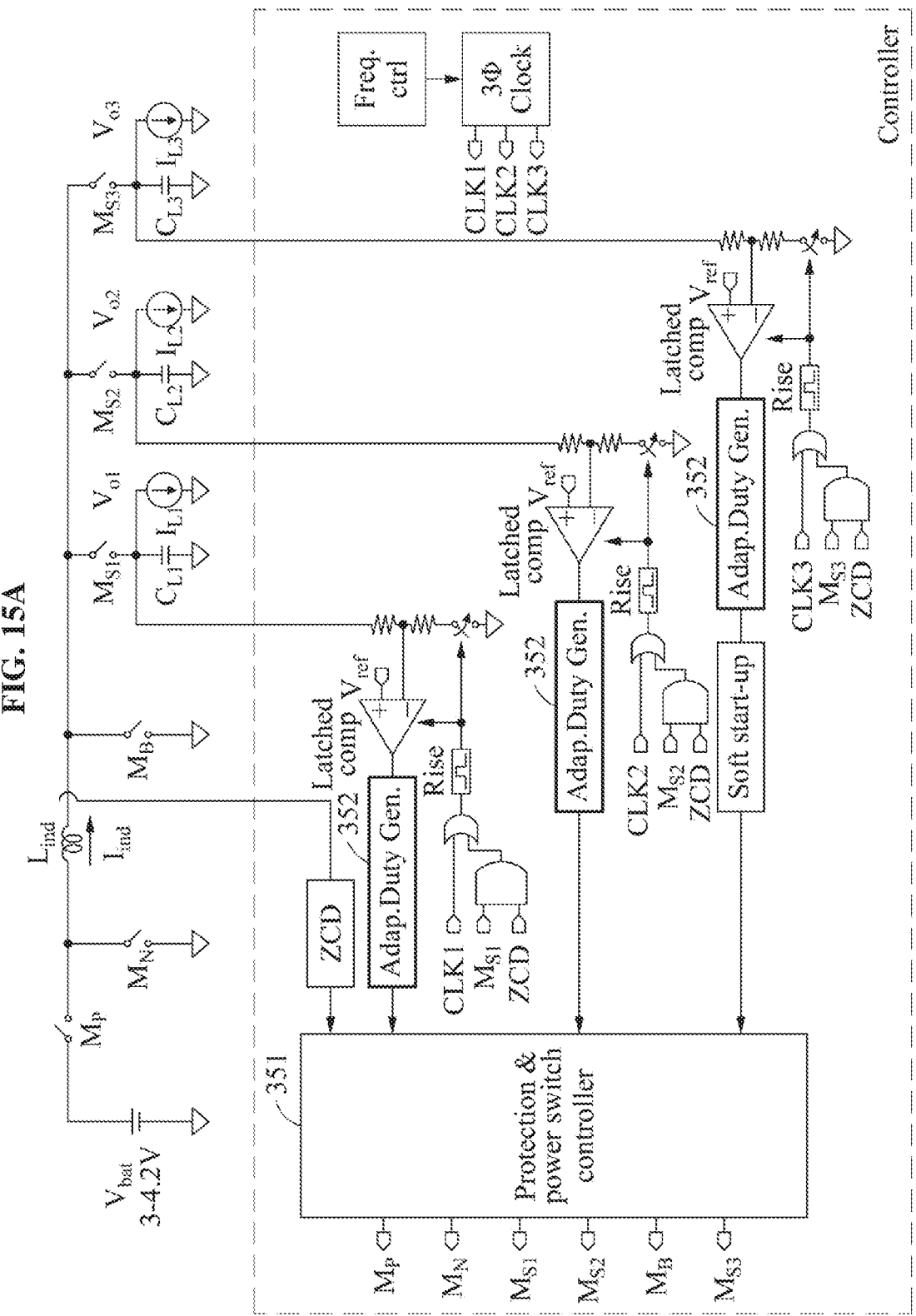
Figure 15B:
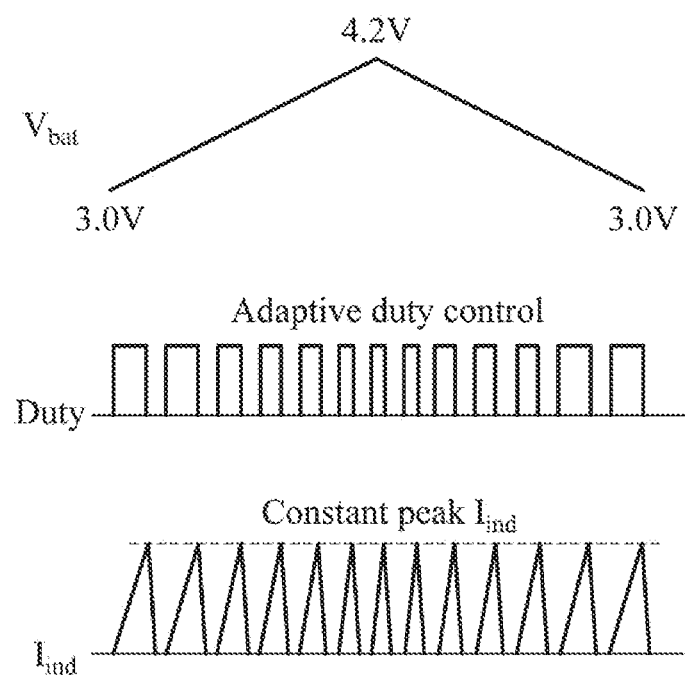
Figure 16:
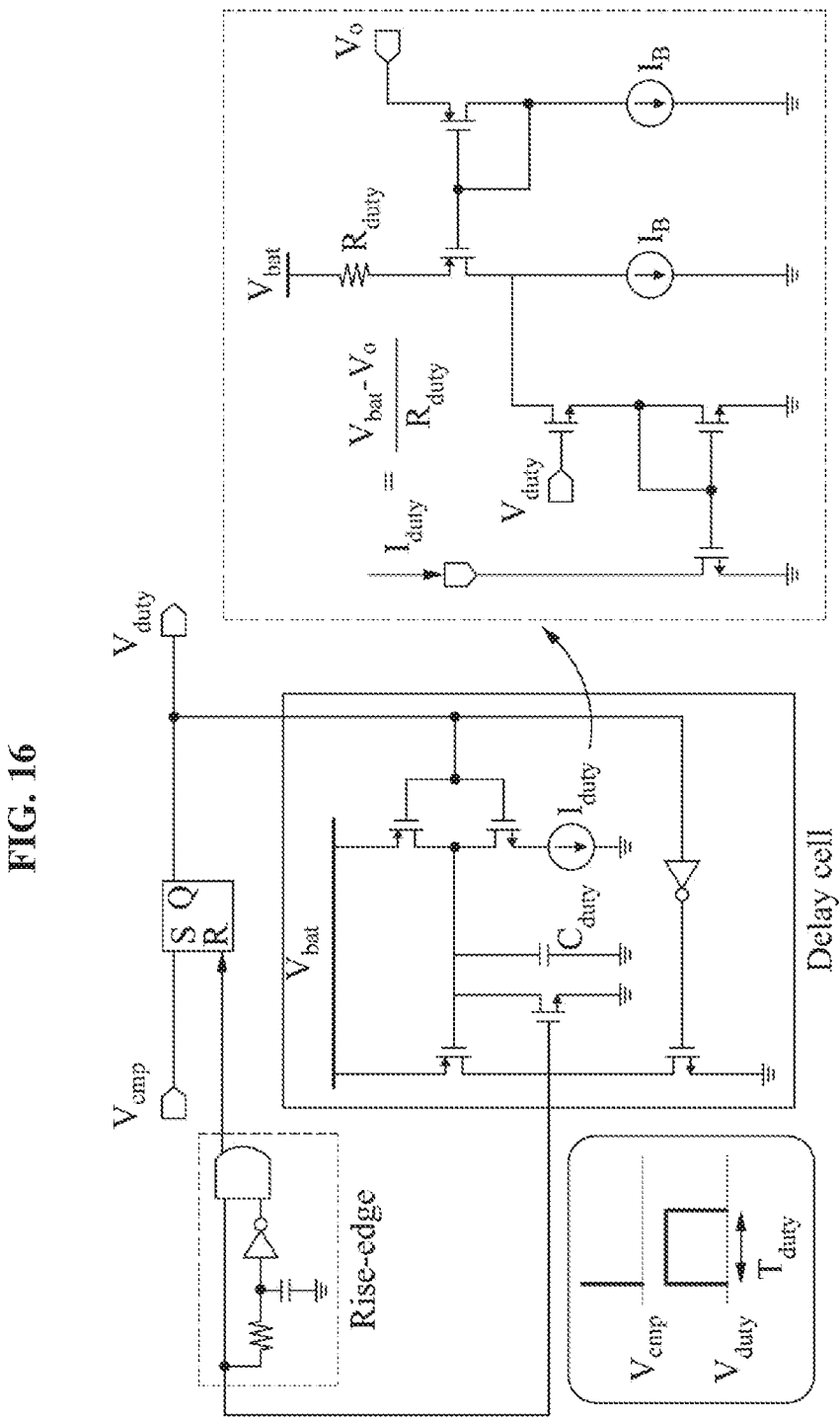

FIGS. 14 through 16 illustrate examples of a method of adaptively controlling a duty-ratio in an adaptive duty generator of a SIMO converter. FIG. 14 illustrates situations in which a variation of an output voltage changes in response to a change in an input voltage V$_{bat}$ of the SIMO converter when a duty-ratio of switches is fixed.

A variation ΔI$_{ind}$ of an inductor current L$_{ind}$ based on the input voltage V$_{bat}$ of the SIMO converter is obtained using Equation 1 as shown below.

$$\Delta I_{ind} = \frac{V_{bat} - V_o}{L_{ind}} DT \qquad \text{Equation 1}$$

In Equation 1, L$_{ind}$ denotes an inductor current of the SIMO converter.

Also, a variation ΔV$_o$ of the output voltage V$_o$ of the SIMO converter corresponding to a variation of the inductor current is obtained using Equation 2 as shown below.

$$\Delta V_o = \sqrt{\frac{L_{ind}}{C_o}} \Delta I_{ind} = \frac{1}{\sqrt{C_o L_{ind}}} (V_{bat} - V_o) DT \qquad \text{Equartion 2}$$

In Equation 2, C$_o$ represents a capacitance value of a capacitor connected to an output port of the SIMO converter. Also, DT denotes a duty-ratio of switches of the SIMO converter. DT may have a fixed value.

For example, when the input voltage V$_{bat}$ of the SIMO converter has an intermediate voltage Mid V$_{bat}$, the variation ΔI$_{ind}$ of the inductor current and the variation ΔV$_o$ of the output voltage may be as shown in section 1410 of FIG. 14.

When the input voltage V$_{bat}$ of the SIMO converter has a higher voltage High V$_{bat}$ than the intermediate voltage Mid V$_{bat}$, and when DT has a fixed duty-ratio, a peak of the inductor current L$_{ind}$ is increased to be higher than the intermediate voltage according to Equation 1 as shown in section 1430 of FIG. 14. Accordingly, the output voltage V$_o$ of the SIMO converter may also be increased to be higher than the intermediate voltage according to Equation 2.

When the input voltage V$_{bat}$ of the SIMO converter has a lower voltage Low V$_{bat}$ than the intermediate voltage Mid V$_{bat}$, and when DT has a fixed duty-ratio, a peak of the inductor current L$_{ind}$ is reduced to be lower than the intermediate voltage according to Equation 1 as shown in section 1450 of FIG. 14. Accordingly, the output voltage V$_o$ of the SIMO converter may also be reduced to be lower than the intermediate voltage according to Equation 2.

As such, when the duty-ratio is fixed, a peak of the inductor current L$_{ind}$ is changed in response to a change in the input voltage V$_{bat}$ of the SIMO converter, which may result in a ripple in the output voltage V$_o$ of the SIMO converter.

FIG. 15A illustrates adaptive duty generators 352. FIG. 15B illustrates a graph representing a peak of an inductor current L$_{ind}$ is constantly maintained by dynamically controlling a duty-ratio of second switches when an input voltage $V_{bat}$ of the SIMO converter changes in a range between 3 V and 4.2 V.

The adaptive duty generators 352 of FIG. 15A may prevent an occurrence of a ripple in the output voltage $V_o$ of the SIMO converter by dynamically controlling a duty-ratio of the second switches $M_P$, $M_N$, and $M_B$ based on the input voltage of the SIMO converter.

For example, as illustrated in FIG. 15B, when the input voltage of the SIMO converter gradually increases from 3.0 V to 4.2 V, the adaptive duty generators 352 may gradually reduce the duty-ratio of the second switches $M_P$, $M_N$, and $M_B$. In response to the duty-ratio of the second switches $M_P$, $M_N$, and $M_B$ being reduced, a peak value of the inductor current $I_{ind}$ is also maintained at a predetermined level. As such, when the peak value of the inductor current is constantly maintained, the output voltage $V_o$ is also constantly maintained to prevent the occurrence of the ripple.

FIG. 16 illustrates a circuit diagram of the adaptive duty generators 352.

In the circuit diagram of FIG. 16, a length of duty interval $T_{duty}$ corresponding to a duty-ratio is obtained using Equation 3 as shown below.

$$T_{duty} = \frac{C_{duty}}{I_{duty}} V_{th} = \frac{C_{duty} R_{duty}}{V_{bat} - V_o} V_{th} \qquad \text{Equation 3}$$

In Equation 3, $C_{duty}$ denotes a predetermined capacitor value, $R_{duty}$ denotes a predetermined resistor value (a constant value), $V_{th}$ denotes a threshold of a transistor (PMOS), and $V_o$ is a constant value. $I_{duty}$ denotes a current generated based on a battery voltage $V_{bat}$.

$I_{duty}$ is determined as, for example, $$I_{duty} = \frac{V_{bat} - V_o}{R_{duty}}$$

based on the determined resistor value $R_{duty}$, the battery voltage $V_{bat}$, and the constant value $V_o$. $I_{duty}$ flows through the predetermined capacitor $C_{duty}$ so as to change a voltage of an upper terminal of $C_{duty}$. When the voltage changes and the voltage exceeds a threshold $V_{th}$ of a rear-end transistor (PMOS), a status is transited so that a duty interval $T_{duty}$ is determined. For example, the duty interval $T_{duty}$ may be $$T_{duty} = \frac{C_{duty}}{I_{duty}} V_{th}.$$

Also, when the duty-ratio is adaptively changed as illustrated in the circuit diagram of FIG. 16, a variation $\Delta V_o$ of the output voltage of the SIMO converter may be obtained using Equation 4 as shown below.

$$\Delta V_o = \frac{1}{\sqrt{L_{ind} C_o}} (V_{bat} - V_o) T_{duty} = \frac{1}{\sqrt{L_{ind} C_o}} C_{duty} R_{duty} V_{th} \qquad \text{Equation 4}$$

$C_o$ corresponds to a capacitance value of a capacitor connected to an output port of the SIMO converter.

Figure 17:
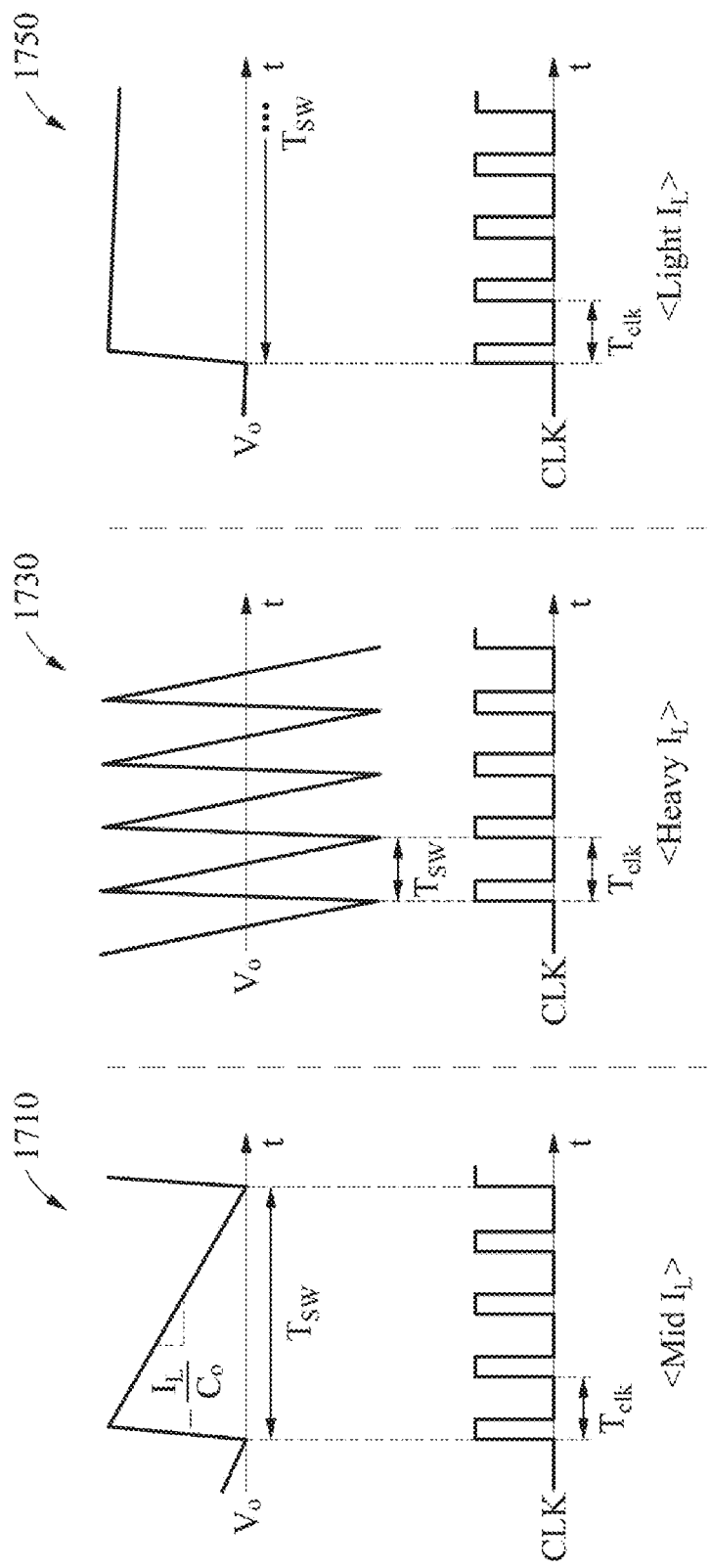
FIGS. 17 through 19 illustrate examples of a method of dynamically controlling a frequency of a clock corresponding to each channel in a SIMO converter, in accordance with one or more embodiments.
Figure 18A:
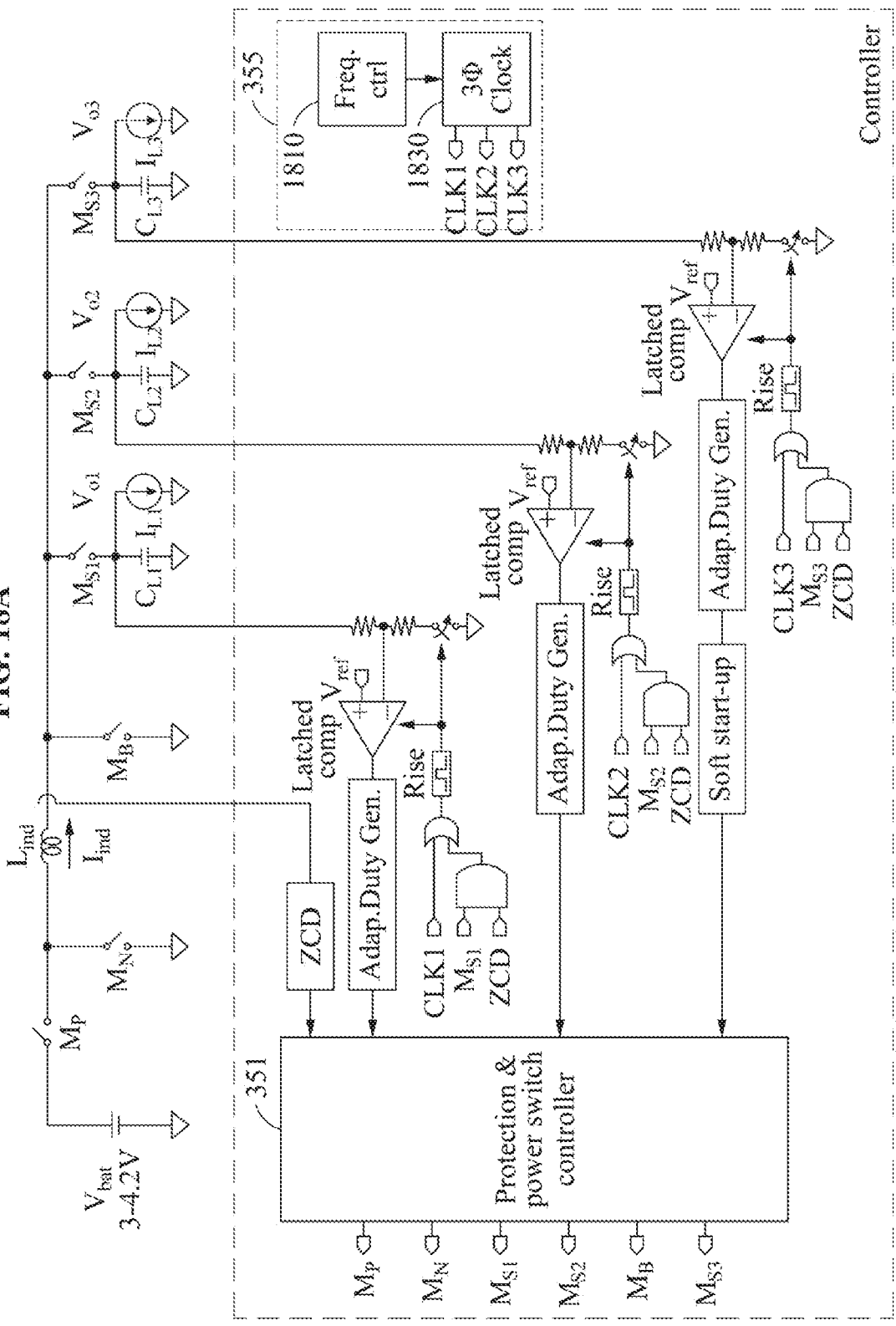
Figure 18B:
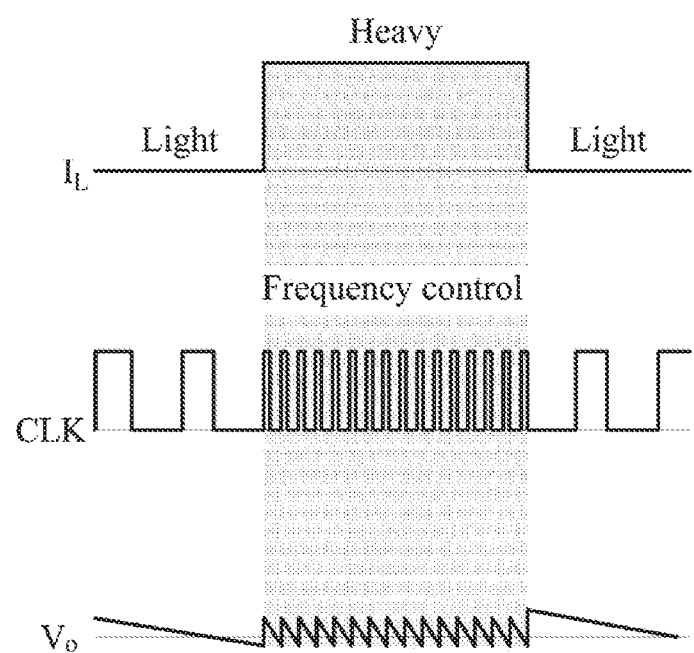
Figure 19:
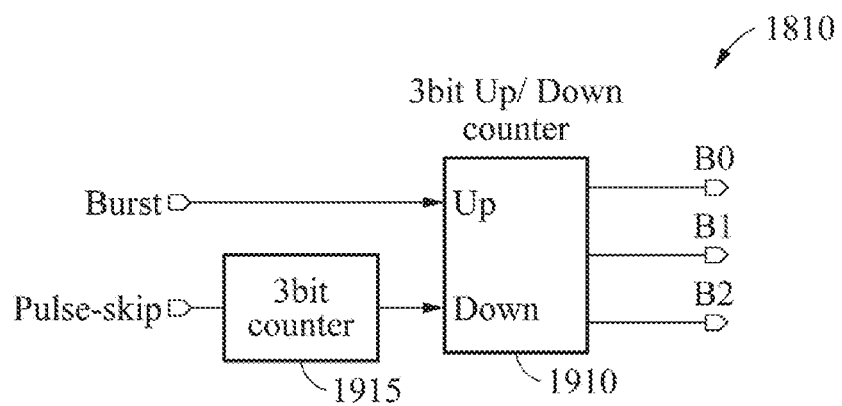
Figure 19:
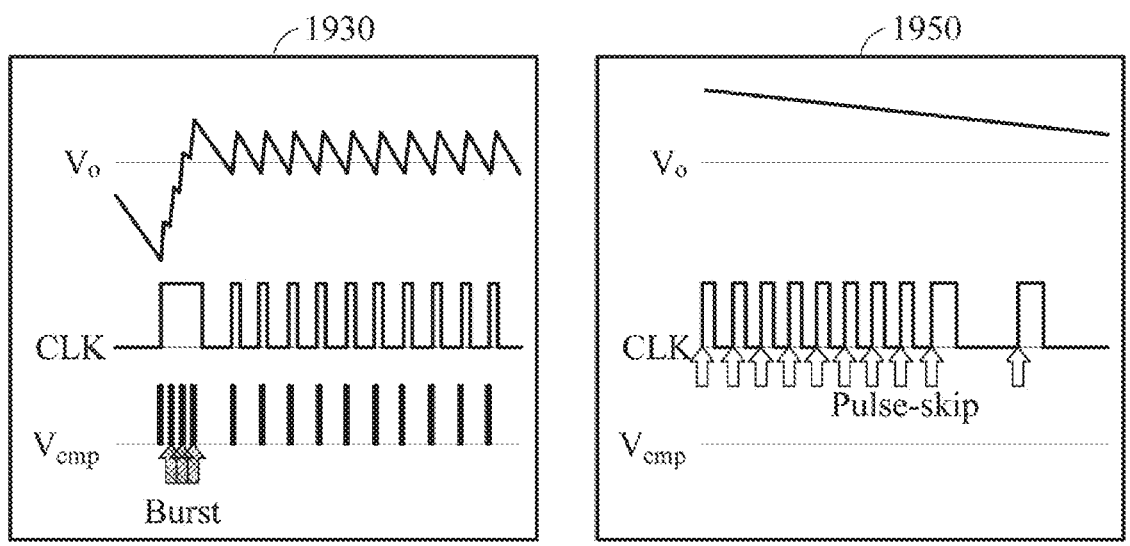

FIGS. 17 through 19 illustrate examples of a method of dynamically controlling a frequency of a clock corresponding to each channel in a SIMO converter. FIG. 17 illustrates output voltages corresponding to load currents $I_L$ under a light load condition, an intermediate load condition, and a heavy load condition.

A relationship between the load current $I_L$ and a clock frequency is expressed by Equation 5 as shown below.

$$T_{sw} = N \cdot T_{clk} = \frac{C_o V_o}{I_L} (N \geq 1) \qquad \text{Equation 5}$$

In Equation 5, N denotes a number of clock occurrences and $T_{clk}$ denotes a clock frequency. $T_{sw}$ denotes a period of time in which switching occurs for actual power transfer, for example, a switching period.

In Equation 5, when the clock frequency $T_{clk}$ is fixed, the switching period $T_{sw}$ changes in response to a change in load current as follows.

When the load current of the SIMO converter is an intermediate load current Mid $I_L$ as shown in section 1710 of FIG. 17, power may be transferred by performing the switching once per 4 clocks. In addition, when the load current of the SIMO is a heavy load current Heavy $I_L$ as shown in section 1730 of FIG. 17, the power may be transferred by performing the switching for each clock. Also, when the load current of the SIMO converter is a light load current Light $I_L$ as shown in section 1750 of FIG. 17, no or few switching may be performed.

FIG. 18A illustrates a clock controller 355 and FIG. 18B illustrates a method of controlling a clock with the clock controller 355 based on an inductor current. The clock controller 355 dynamically controls a frequency of a clock corresponding to a channel based on a load in the channel. The clock controller 355 controls clocks to supply clock pulses having different frequencies corresponding to a plurality of channels in response to a change in inductor current. In this example, the clock controller 355 controls clocks to sequentially supply clock pulses with different frequencies corresponding to the plurality of channels based on a time multiplexing scheme. The clock controller 355 includes a frequency controller 1810 and a 3-phase (φ) clock generator 1830. An operation of the frequency controller 1810, for example, a Freq controller will be described in detail with reference to FIG. 19. An operation of the 3-phase clock generator 1830 will be described in detail with reference to FIG. 20.

For example, as illustrated in FIG. 18B, when a load of a load current of the SIMO converter is light in a corresponding channel, no or few switching may be performed. Also, when the load of the load current is heavy, the power may be transferred by performing switching for each clock.

FIG. 19 illustrates a configuration and an operation of the frequency controller 1810 in accordance with one or more embodiments.

The frequency controller 1810 counts a number of times that the SIMO converter operates in a first mode and a number of times that the SIMO converter operates in a second mode using a 3-bit up/down counter 1910. The frequency controller 1810 dynamically controls a frequency of a clock corresponding to a corresponding channel based on the counted number of times. When the counted number of times corresponds to a preset number of times, the frequency controller 1810 dynamically controls a frequency of a clock corresponding to a corresponding channel. In this example, a preset number of times corresponding to the first mode may be the same as or different from a preset number of times corresponding to the second mode. In an example, unlike a number of first mode occurrences, a number of second mode occurrences may be input to the 3-bit up/down counter 1910 via another 3-bit counter 1910. In this example, the number of second mode occurrences may be transferred to the 3-bit up/down counter 1910 three times slower than the number of first mode occurrences.

For example, to increase the output voltage $V_O$, the SIMO converter may operate four times in the first mode (burst mode) as shown in a box 1930, and the preset number of times corresponding to the first mode may be 4. Since the number of times that the SIMO converter operates in the first mode, which is 4, corresponds to the preset number of times (4), the frequency controller 1810 may adjust a clock frequency to be increased.

Also, when the output voltage $V_o$ does not need to be increased, the SIMO may operate nine times in the second mode (pulse skip mode) as shown in a box 1950, and, in a non-limiting example, the preset number of times corresponding to the second mode may be 9. Since the number of times that the SIMO converter operates in the second mode, which is 9, corresponds to the preset number of times, that is, 9, the frequency controller 1810 may adjust a clock frequency to be decreased.

In an example, a frequency of a common clock is dynamically controlled by monitoring modes of a single channel (for example, 1.8 V). Since a plurality of channels uses the frequency of the common clock by dividing the frequency, clock frequencies of the plurality channels may be dynamically controlled in response to the frequency of the common clock being dynamically controlled. For example, an output voltage $V_o$ of FIG. 19 is an output voltage of a predetermined channel (1.8 V) and a clock CLK of FIG. 19 is a common clock.

In an example, a frequency of a common clock is dynamically controlled by monitoring modes of a plurality of channels. For example, the frequency of the common clock may be reduced by operating at least a preset number of times in the second mode (pulse skip mode) in one channel. Also, the frequency of the common clock may be increased by operating at least a preset number of times in the first mode (burst mode) in another channel. In this example, an output voltage $V_o$ of FIG. 19 is an output voltage of a channel among the plurality of channels and a clock CLK of FIG. 19 is a common clock.

Figure 20:
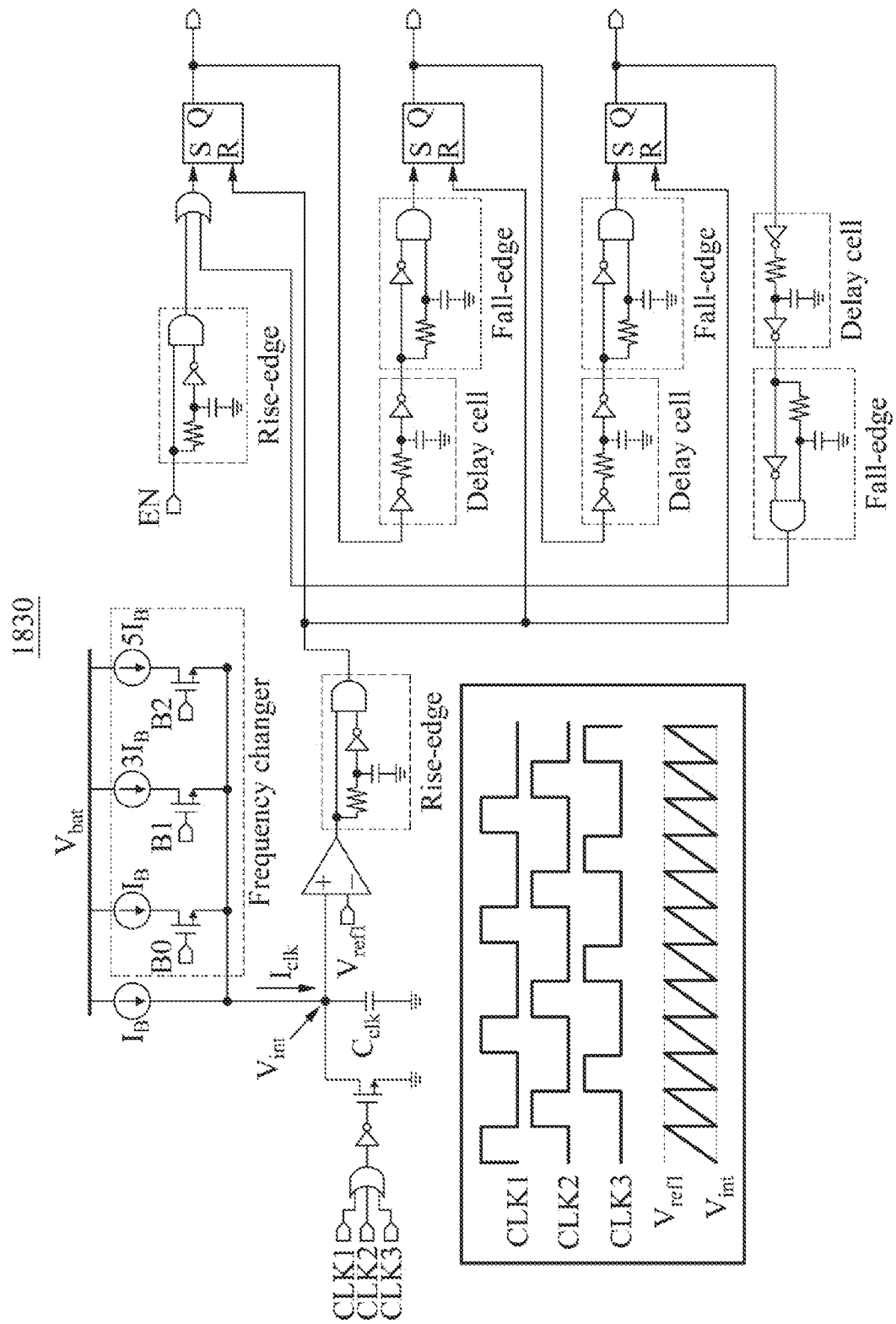
FIG. 20 illustrate an example of a clock generator that generates clocks having different phases in a SIMO converter, in accordance with one or more embodiments.

FIG. 20 illustrates an example of a clock generator that generates clocks having different phases in a SIMO converter. FIG. 20 illustrates a configuration and an operation of a 3-phase (φ) clock generator 1830. The 3-phase clock generator 1830 generates clocks having three different phases in the SIMO converter. The 3-phase clock generator 1830 generates clocks having a frequency $f_{clk}$ using Equation 6 as shown below.

$$f_{clk} = \frac{I_{clk}}{3C_{clk} \cdot V_{ref1}} \qquad \text{Equation 6}$$

In Equation 6, $C_{clk}$ denotes a capacitance value of a clock capacitor of a capacitor connected to an output power of a clock in parallel. $V_{ref1}$ denotes a reference voltage of a channel (for example, a first channel) applied from a comparator. $I_{clk}$ denotes a clock current applied from the frequency controller 1810 to the 3-phase clock generator 1830.

The SIMO converter provides desired voltages of a plurality of channels using a time multiplexing scheme based on the clocks having different phases generated by the 3-phase clock generator 1830 of FIG. 20.

Figure 21A:
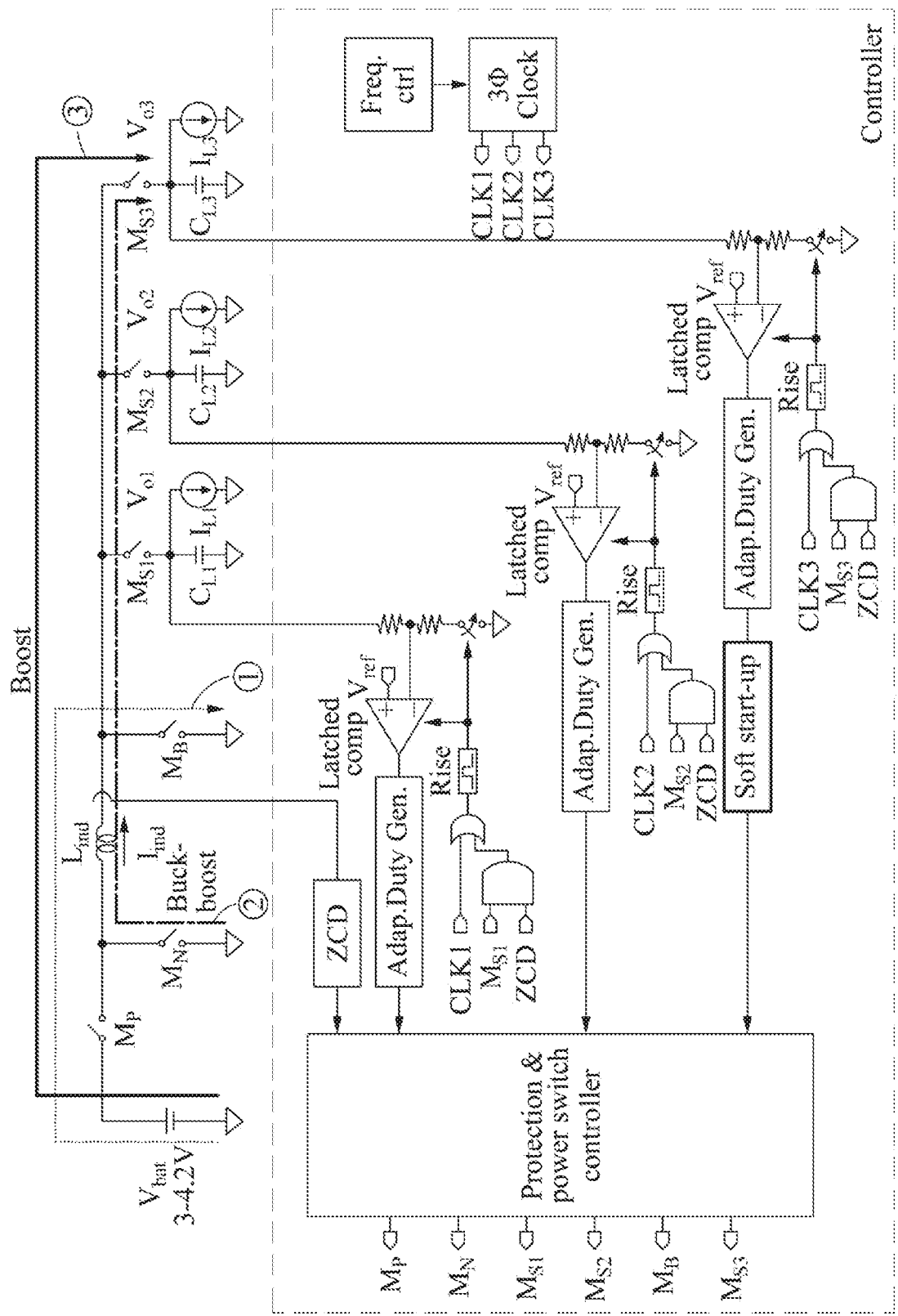
FIGS. 21A and 21B illustrate examples of an operation of a soft start-up circuit of a SIMO converter.
Figure 21B:
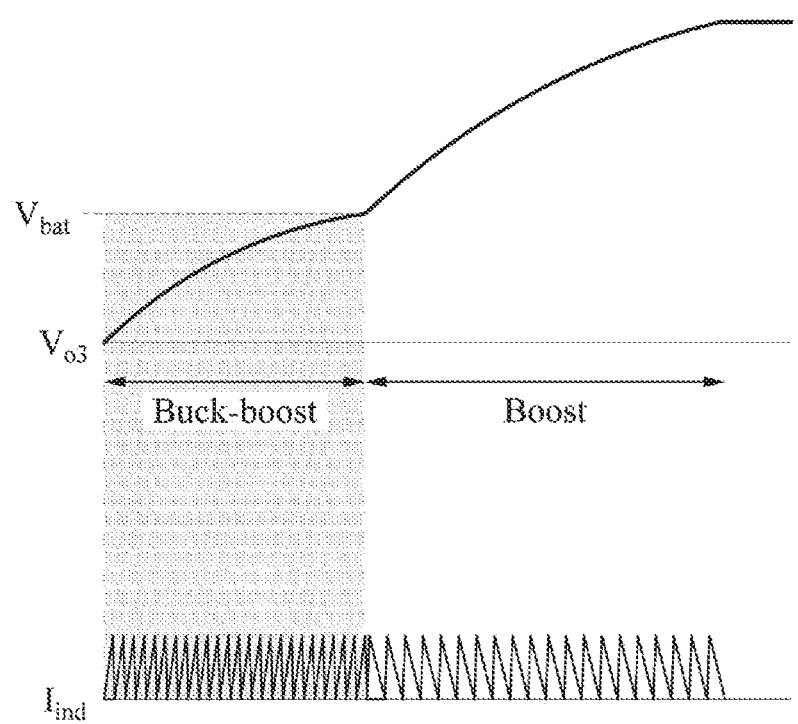

FIGS. 21A and 21B illustrate examples of an operation of a soft start-up circuit of a SIMO converter. FIG. 21A illustrates a buck-boost operation and a boost operation for preventing an abrupt flow of a current using a soft start-up circuit. FIG. 21B illustrates a change in an output voltage $V_{O3}$ of a third channel during the buck-boost operation and the boost operation.

As described with reference to FIG. 10, the soft start-up circuit may prevent an abrupt increase in inductor current, for example, in rush current.

For example, when a signal is transferred in the soft start-up circuit, the signal is transferred through the switch controller 351 such that each switch performs the buck-boost operation. The buck-boost operation is performed in an order indicated by arrows ① and ② in FIG. 21A.

In the buck-boost operation, the switch controller 351 turns on a 2-$1^{st}$ switch $M_P$ and a 2-$3^{rd}$ switch $M_B$ as indicated by the arrow ① and turns off remaining switches. In this process, an input voltage $V_{bat}$ of the SIMO converter may be grounded via the 2-$3^{rd}$ switch $M_B$. Thereafter, the switch controller 351 turns on a 2-$2^{nd}$ switch $M_N$ and a 1-$3^{rd}$ switch $M_{S3}$ as indicated by the arrow ② and turns off remaining switches. In this process, only a voltage due to an inductor current $I_{ind}$ may be supplied to the output voltage $V_{O3}$ of the third channel via the 1-$3^{rd}$ switch $M_{S3}$. The switch controller 351 performs the buck-boost operation until the output voltage $V_{O3}$ of the third channel is equal to the input voltage $V_{bat}$ of the SIMO converter. Referring to FIG. 21B, it is shown that the output voltage $V_{O3}$ of the third channel is moderately increased while the buck-boost operation is performed.

When the output voltage $V_{O3}$ of the third channel is equal to the input voltage $V_{bat}$ of the SIMO converter, the switch controller 351 performs the boost operation.

In the boost operation, the switch controller 351 turns on the 2-$1^{st}$ switch $M_P$ and 1-$3^{rd}$ switch $M_{S3}$ as indicated by an arrow ③ and turns off remaining switches. In this process, in addition to the voltage due to the inductor current $I_{ind}$ of the inductor, the input voltage $V_{bat}$ of the SIMO converter may also be supplied. In this case, the output voltage $V_{O3}$ of the SIMO converter rises sharply from the input voltage $V_{bat}$ as illustrated in FIG. 21B.

As such, a soft start-up circuit slowly increases the output voltage $V_{O3}$ of the third channel to reach a level of the input voltage $V_{bat}$ (3 V to 4.2 V) of the SIMO converter through the buck-boost operation. After that, the soft start-up circuit quickly increases the output voltage $V_{O3}$ of the third channel to reach the reference voltage (for example, 12 V) through the boost operation. Through this, the soft start-up circuit prevents an occurrence of a ripple current due to the abrupt increase in the amount of current.

FIG. 22 is flowchart illustrating an example of a control method of a SIMO converter. The operations in FIG. 22 may be performed in the sequence and manner as shown, although the order of some operations may be changed or some of the operations omitted without departing from the spirit and scope of the illustrative examples described. Many of the operations shown in FIG. 22 may be performed in parallel or concurrently. One or more blocks of FIG. 22, and combinations of the blocks, can be implemented by special purpose hardware-based computer that perform the specified functions, or combinations of special purpose hardware and computer instructions. In addition to the description of FIG. 22 below, the descriptions of FIGS. 1-21 are also applicable to FIG. 22, and are incorporated herein by reference. Thus, the above description may not be repeated here.

Referring to FIG. 22, in operation 2210, a SIMO converter compares an output voltage of a channel corresponding to a control target among a plurality of channels to a reference voltage of the channel based on a clock of the channel. In this example, the SIMO converter uses a single inductor to provide desired voltages of the plurality of channels.

In operation 2220, the SIMO converter selects a first mode when the output voltage of the channel is lower than the reference voltage of the channel, and selects a second mode when the output voltage is higher than the reference voltage.

When the first mode is selected, in operation 2230, the SIMO converter adaptively adjusts a number of times that a pulse triggering a power transfer to the channel is generated. The SIMO converter adaptively adjusts the number of times that the pulse is generated in a time interval initiated in response to an edge of the clock corresponding to the channel. For example, the SIMO converter repetitively generates the pulse until the output voltage of the channel is higher than the reference voltage of the channel according to the first mode.

In operation 2240, the SIMO converter blocks a generation of the pulse when the second mode is selected.

The SIMO converter counts a number of times that an operation is performed in the first mode and a number of times that an operation is performed in the second mode. The SIMO converter dynamically controls a frequency of the clock corresponding to the channel based on a result obtained by determining whether the counted number of times (for example, the number of times that an operation is performed in the first mode and the number of times that an operation is performed in the second mode) corresponds to a preset number of times. When the number of times that an operation is performed in the first mode corresponds to the preset number of times, the SIMO converter increases the frequency of the clock corresponding to the channel. When the number of times that an operation is performed in the second mode corresponds to the preset number of times, the SIMO converter reduces the frequency of the clock corresponding to the channel.

The SIMO converter 110, the clock frequency controller 201, the SIMO converter 300, the controller 350, and other apparatuses, and devices, and other components described herein with respect to FIGS. 1-22 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIG. 1-22 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A single-inductor multiple-output (SIMO) converter comprising:
   a converter configured to provide respective voltages of a plurality of channels with a single inductor; and
   a control logic configured to control switches of the converter based on clocks corresponding to the plurality of channels, the clocks, corresponding to the plurality of channels, having different phases from each other, and each of the plurality of channels has a different clock frequency;
   wherein the control logic is configured to:
   compare an output voltage of a selected channel, from among the plurality of channels, that corresponds to a control target to a reference voltage of the selected channel in response to an edge of a clock of the selected channel,
   repetitively generate a pulse to transfer power to the selected channel by selecting a burst mode when the output voltage is less than or equal to the reference voltage until the output voltage is greater than the reference voltage,
   block the generation of the pulse by selecting a pulse skip mode when the output voltage of the selected channel is greater than the reference voltage,
   increase a frequency of the clock of the selected channel when the burst mode has occurred a predetermined number of times,
   decrease the frequency of the clock of the selected channel when the pulse skip mode has occurred the predetermined number of times, and
   control the clocks to supply clock pulses having different frequencies corresponding to the plurality of channels in response to a change in inductor current.

2. The SIMO converter of claim 1, wherein the control logic is further configured to repetitively generate the pulse in the burst mode until the output voltage of the selected channel is higher than the reference voltage of the selected channel based on a determination that the output voltage of the selected channel is lower than the reference voltage of the selected channel.

3. The SIMO converter of claim 1, wherein the control logic is further configured to block the generation of the pulse in the pulse skip mode based on a determination that the output voltage of the selected channel is higher than the reference voltage of the selected channel.

4. The SIMO converter of claim 1, wherein the control logic is further configured to dynamically control a frequency of the clock corresponding to the selected channel based on a number of times that an operation is performed in the burst mode and a number of times that an operation is performed in the pulse skip mode.

5. The SIMO converter of claim 1, wherein the converter is further configured to provide the respective voltages of the plurality of channels based on the clocks having different phases based on a time multiplexing scheme.

6. The SIMO converter of claim 1, wherein, in the burst mode, the control logic is further configured to adaptively adjust the number of times that the pulse is generated in a time interval initiated in response to an edge of the clock corresponding to the selected channel.

7. The SIMO converter of claim 1, wherein the converter comprises:
   the single inductor; and
   a switching unit comprising first switches configured to select the plurality of channels and second switches configured to control a flow of a current flowing in the single inductor.

8. The SIMO converter of claim 7, wherein the first switches are configured to connect output ports of the plurality of channels and the single inductor in series.

9. The SIMO converter of claim 7, wherein the second switches comprise a 2-$1^{st}$ switch, a 2-$2^{nd}$ switch, and a 2-$3^{rd}$ switch,
   the 2-$1^{st}$ switch is configured to have a first end connected to an input port of the converter and a second end connected to a first end of the single inductor, the 2-2$^{nd}$ switch is configured to have a first end connected to the first end of the single inductor, and a second end of the 2-2$^{nd}$ switch is grounded, and the 2-3$^{rd}$ switch is configured to have a first end connected to a second end of the single inductor, and a second end of the 2-3$^{rd}$ switch is grounded.

10. The SIMO converter of claim 7, wherein the control logic comprises:
a switch controller configured to select a first switch for the selected channel from among the first switches in response to the pulse being generated, and control the second switches based on a sequence for generating a desired voltage of the selected channel.

11. The SIMO converter of claim 10, wherein the control logic is configured to dynamically control a duty-ratio of the second switches based on an input voltage of the converter.

12. The SIMO converter of claim 1, wherein the control logic is further configured to reset a current of the single inductor after the power transfer is triggered due to the generation of the pulse.

13. The SIMO converter of claim 1, wherein the control logic is further configured to dynamically control a frequency of the clock corresponding to the selected channel based on a load in the channel.

14. The SIMO converter of claim 1, wherein the control logic comprises:
a comparator configured to latch the output voltage of the selected channel at an edge of the clock corresponding to the channel, and compare the latched output voltage to the reference voltage of the channel.

15. The SIMO converter of claim 1, wherein the control logic is further configured to generate the clocks corresponding to the plurality of channels based on an importance level of the plurality of channels and control lengths of time intervals corresponding to phases of the clocks.

16. A control method comprising:
comparing, based on a clock of a selected channel corresponding to a control target among a plurality of channels, an output voltage of the selected channel to a reference voltage of the selected channel, clocks corresponding to the plurality of channels, each of the clocks having different phases from each other, and each of the plurality of channels having a different clock frequency;
selecting a burst mode when the output voltage is less than or equal to the reference voltage, and selecting a pulse skip mode when the output voltage is higher than the reference voltage;
adaptively adjusting, when the burst mode is selected, a number of times that a pulse triggering a power transfer to the selected channel is generated;
blocking a generation of the pulse when the pulse skip mode is selected,
increasing a frequency of the clock of the selected channel when the burst mode has occurred a predetermined number of times,
decreasing the frequency of the clock of the selected channel when the pulse skip mode has occurred the predetermined number of times, and
controlling each of the clocks to supply clock pulses having different frequencies corresponding to the plurality of channels in response to a change in inductor current.

17. The control method of claim 16, wherein the adaptively adjusting the number of times that the pulse is generated comprises:
repetitively generating the pulse until the output voltage of the selected channel is higher than the reference voltage of the selected channel based on the burst mode.

18. The control method of claim 16, wherein the adaptively adjusting the number of times that the pulse is generated comprises:
adaptively adjusting the number of times that the pulse is generated in a time interval initiated in response to an edge of the clock corresponding to the selected channel.

19. The control method of claim 16, further comprising:
counting a number of times that an operation is performed in the burst mode and a number of times that an operation is performed in the pulse skip mode; and
dynamically controlling a frequency of the clock corresponding to the selected channel based on a determination that the counted number of times corresponds to a preset number of times.

20. The control method of claim 19, wherein the dynamically controlling the frequency of the clock comprises:
increasing the frequency of the clock corresponding to the selected channel when the number of times that an operation is performed in the burst mode corresponds to the preset number of times.

21. The control method of claim 19, wherein the dynamically controlling the frequency of the clock comprises:
reducing the frequency of the clock corresponding to the selected channel when the number of times that an operation is performed in the pulse skip mode corresponds to the preset number of times.

22. A non-transitory computer-readable storage medium storing instructions that, when executed by a processor, cause the processor to perform the control method of claim 16.

23. A method comprising:
comparing, in a single inductor multiple output (SIMO) converter, an output voltage of a selected channel among a plurality of channels to a reference voltage of the selected channel in response to an edge of a clock of the selected channel, the clocks corresponding to the plurality of channels having phases different from each other, and each of the plurality of channels having a different clock frequency;
selecting a burst mode to repetitively generate a pulse to transfer power to the selected channel when the output voltage of the selected channel is less than or equal to the reference voltage, and
selecting a pulse skip mode to block the generation of the pulse when the output voltage of the selected channel is greater than the reference voltage, and
controlling the clocks to supply clock pulses having different frequencies corresponding to the plurality of channels in response to a change in inductor current.

24. The method of claim 23, further comprising adjusting a number of times a pulse triggering a power transfer to the selected channel is generated when the burst mode is selected, and blocking a generation of the pulse when the pulse skip mode is selected.

25. The method of claim 23, wherein the SIMO converter dynamically controls a frequency of the clock corresponding to the selected channel by comparing a number of times that an operation is performed in the burst mode to a preset number of times, and comparing a number of times that an operation is performed in the pulse skip mode to the preset number of times.

26. The method of claim 25, wherein the SIMO converter increases a frequency of the clock corresponding to the selected channel when the number of times that the operation is performed in the burst mode corresponds to the preset number of times.

27. The method of claim 25, wherein the SIMO converter reduces the frequency of the clock corresponding to the selected channel when the number of times that an operation is performed in the pulse skip mode corresponds to the preset number of times.

* * * * *